US009660310B2

(12) United States Patent
Mak et al.

(10) Patent No.: US 9,660,310 B2
(45) Date of Patent: May 23, 2017

(54) ELECTRODE MATERIALS FOR METAL-AIR BATTERIES, FUEL CELLS AND SUPERCAPACITORS

(75) Inventors: Wai Fatt Mak, Singapore (SG); Ting Wang, Singapore (SG); Nopphawan Phonthammachai, Singapore (SG); Madhavi Srinivasan, Singapore (SG); Subodh Mhaisalkar, Singapore (SG); Yin Chiang Freddy Boey, Singapore (SG)

(73) Assignee: Nanyang Technological University, Singapore (SG)

( * ) Notice: Subject to any disclaimer, the term of this patent is extended or adjusted under 35 U.S.C. 154(b) by 722 days.

(21) Appl. No.: 13/062,910

(22) PCT Filed: Sep. 7, 2009

(86) PCT No.: PCT/SG2009/000319
§ 371 (c)(1),
(2), (4) Date: May 26, 2011

(87) PCT Pub. No.: WO2010/027337
PCT Pub. Date: Mar. 11, 2010

(65) Prior Publication Data
US 2011/0229777 A1 Sep. 22, 2011
US 2012/0115046 A2 May 10, 2012

Related U.S. Application Data

(60) Provisional application No. 61/095,085, filed on Sep. 8, 2008.

(51) Int. Cl.
*H01M 12/06* (2006.01)
*H01M 4/96* (2006.01)
(Continued)

(52) U.S. Cl.
CPC ....... *H01M 12/065* (2013.01); *H01M 4/8605* (2013.01); *H01M 8/1007* (2016.02);
(Continued)

(58) Field of Classification Search
CPC ................. H01M 12/06; H01M 4/96
(Continued)

(56) References Cited

U.S. PATENT DOCUMENTS 5,449,575 A * 9/1995 Moulton ................. 429/179
7,594,982 B1 9/2009 Roscheisen et al.
(Continued)

FOREIGN PATENT DOCUMENTS

CN 1624961 A 6/2005
CN 1679188 A 10/2005
(Continued)

OTHER PUBLICATIONS

Zhang et al., "A new air electrode based on carbon nanotubes and Ag—MnO2 for metal air electrochemical cells" Carbon 42 (2004) 3097-3102.*
(Continued)

*Primary Examiner* — Rena D Cronin
(74) *Attorney, Agent, or Firm* — Alston & Bird LLP

(57) ABSTRACT

The present invention refers to an electrode comprised of a first layer which comprises a mesoporous nanostructured hydrophobic material; and a second layer which comprises a mesoporous nanostructured hydrophilic material arranged on the first layer. In a further aspect, the present invention refers to an electrode comprised of a single layer which comprises a mixture of a mesoporous nanostructured hydrophobic material and a mesoporous nanostructured hydrophilic material; or a single layer comprised of a porous nanostructured material wherein the porous nanostructured material comprises metallic nanostructures which are bound to the surface of the porous nanostructured material. The present invention further refers to the manufacture of these electrodes and their use in metal-air batteries, supercapacitors and fuel cells.

25 Claims, 14 Drawing Sheets

(51) Int. Cl.
H01M 4/86 (2006.01)
H01M 8/1007 (2016.01)
(52) U.S. Cl.
CPC .............. H01M 4/96 (2013.01); Y02E 60/50 (2013.01); Y02E 60/523 (2013.01); Y02P 70/56 (2015.11)
(58) Field of Classification Search
USPC .............................. 429/532, 530, 523, 521
See application file for complete search history.

(56) References Cited

U.S. PATENT DOCUMENTS

| | | | |
|---|---|---|---|
| 2003/0049517 A1* | 3/2003 | Hampden-Smith et al. | ... 429/44 |
| 2004/0013935 A1* | 1/2004 | Ye et al. | ........................ 429/44 |
| 2004/0131934 A1 | 7/2004 | Sugnaux et al. | |
| 2004/0157110 A1* | 8/2004 | Knights et al. | ................. 429/44 |
| 2005/0026012 A1 | 2/2005 | O'Hara | |
| 2005/0221141 A1* | 10/2005 | Hampden-Smith et al. | ... 429/33 |
| 2005/0255373 A1 | 11/2005 | Kimura et al. | |
| 2006/0142148 A1 | 6/2006 | Ma et al. | |
| 2007/0048594 A1 | 3/2007 | Oh et al. | |
| 2007/0092787 A1* | 4/2007 | Wang Chen | .................... 429/45 |
| 2008/0280169 A1* | 11/2008 | Niu et al. | ........................ 429/13 |
| 2009/0042087 A1 | 2/2009 | Hori et al. | |
| 2012/0282540 A1 | 11/2012 | Niu et al. | |

FOREIGN PATENT DOCUMENTS

| | | |
|---|---|---|
| CN | 1921192 A | 2/2007 |
| CN | 101107737 A | 1/2008 |
| DE | 10345261 A1 | 4/2005 |
| JP | 2006-216385 A | 8/2006 |

OTHER PUBLICATIONS

Ng et al., "Single wall carbon nanotube paper as anode for lithium-ion battery" Electrochimica Acta 51 (2005) 23-28.*
Chinese Office Action for Application No. 200980144224.3, dated Apr. 3, 2013.
Chinese Office Action for Application No. 200980144221.3; dated Dec. 11, 2013.
International Search Report and Written Opinion for Application No. PCT/SG2009/000319; dated Oct. 21, 2009.
Office Action for Chinese Application No. 200980144221.3 dated Jul. 14, 2014.
Office Action for Japanese Application No. 2011-526016 dated Mar. 11, 2014.
Beck, F. et al., *Rechargable Batteries With Aqueous Electrolytes*, Electrochimica Acta, 45, (2000), pp. 2467-2482.
Barisci, J. N. et al., *Electrochemical Studies of Single-Wall Carbon Nanotubes in Aqueous Solutions*, Journal of the Electroanalytical Chemistry, 488, (2000), pp. 92-98.
Bender, S. F. et al., *Zinc/Air Batteries—Button Configuration*, Chapter 13, D. Linden, in: Thomas B. Reddy (Ed.) Handbook of Batteries, McGraw-Hill, , (2001), 3rd edition, pp. 13.1-13.21.
Bekyarova, E. et al., *Electronic Properties of Single-Walled carbon Nanotube Networks*, J. Am Chem. Soc., 127, (2005), pp. 5990-5995.
Blizanac, B. B. et al., *Oxygen Electroreduction on Ag( 1 1 1 ): The pH Effect*, Electrochimica Acta, 52, (2007), pp. 2264-2271.
Britto, P. J. et al., *Improved Charge Transfer at Carbon Nanotube Electrodes*, Advanced Material, 11, (1999), 4 pages.
Chakkaravarthy, C. et al., *Zinc-Air Alkaline Batteries—A Review*, Journal of Power sources, 6, (1981), pp. 203-228.
Che, G. et al., *Carbon Nanotube Membranes for Electrochemical Energy Storage and Production*, Nature, vol. 393, (1998), pp. 346-349.
Claye, A. S. et al., *Solid State Electrochemistry of the Li Single Wall Carbon Nanotube System*, Journal of the Electrochemical Society, 147 (8), (2000), pp. 2845-2852.

Fang, Z. et al., *Preparation and Electrochemical Property of the Three-Phase Gas-Diffusion Oxygen Electrodes for Metal Air Battery*, Electrochemica Acta, 51, (2006), pp. 5654-5659.
Frackowiak, E. et al., *Carbon Materials for the Electrochemical Storage of Energy in Capacitors*, Carbon, 39, (2001), pp. 937-950.
Fuhrer, M. S., *Crossed Nanotube Junctions*, Science, vol. 28, (2000), pp. 494-497.
Gamburzev, S. et al., *Silver-Carbon Electocatalyst for Air Cathodes in Alkaline Fuel Cells*, Journal of Applied Electrochemistry, 32, (2002), pp. 805-809.
Gong, K. et al., *Polymer-Assisted Synthesis of Manganese Dioxide/Carbon Nanotube Nanocomposite With Excellent Electrocatalytic Activity Toward Reduction of Oxygen*, J. Phys. Chem., C, 111, (2007), pp. 1882-1887.
Gruner, G., *Carbon Nanotube Films for Transparent and Plastic Electronics*, J. Mater. Chem., 16, (2006), pp. 3533-3539.
Hsieh, C. et al., *Synthesis and Electrochemical Characterization of Carbon Nanotubes Decorated With Nickel Nanoparticles for Use as an Electrochemical Capacitor*, J. Solid State Electrochem, 12, (2008), pp. 663-669.
Hu, F. et al., *Oxygen Reduction on Ag—MnO$_2$/SWNT and Ag—MnO$_2$/AB Electrodes*, Carbon, 43, (2005), pp. 2931-2936.
Huang, H. et al., *Carbon Nanotubes as a Secondary Support of a Catalyst Layer in a Gas Diffusion Electrode for Metal Air Batteries*, Journal of Colloid and Interface Science, 284 (2005), pp. 593-599.
Jia, N. et al., *Modification of Carbon Supported Catalysts to Improve Performance in Gas Diffusion Electrodes*, Electrochimica Acta, 46, 92001), pp. 2863-2869, (2001).
Jorissen, L., *Bifunctional Oxygen/Air Electrodes*, Journal of Power Sources, 155, (2006), pp. 23-32.
Kaempgen, M. et al., *Bifunctional Carbon Nanotube Networks for Supercapacitors*, Applied Physics Letters, 90, (2007), pp. 264104-1-26104-2.
Kaempgen, M. et al., *Fuel Cells Based on Multifunctional Carbon Nanotube Networks*, Journal of Power Sources, 180, (2008), pp. 755-759.
Kaempgen, M. et al., *Multifunctional Carbon Nanotube Networks for Fuel Cells*, Applied Physics Letters, 92, (2008), pp. 094103-1-094103-3.
Kauffman, D. R. et al., *Chemically Induced Potential Barriers at the Carbon Nanotube—Metal Nanoparticle Interface*, Nano Letters, American Chemical Society, vol. 7, No. 7, (2007), pp. 1863-1868.
Kiebele, A. et al., *Carbon Nanotube Based Battery Architecture*, Applied Physics Letters, 91, (2007), pp. 144104-1-144104-3.
Kiebele, A. et al., *Printed Energy and Power Storage: Batteries and Supercapacitors*, Nanotechnology Law & Business, vol. 5, No. 1, (2008), pp. 7-16.
Kostowskyj, M. A. et al., *Silver Nanowire Catalysts for Alkaline Fuel Cells*, International Journal of Hydrogen Energy, 33, (2008), pp. 5773-5778.
Lima, F. H. B. et al., *Physical Characterization and Electrochemical Activity of Bimetallic Platinum-Silver Particles for Oxygen Reduction in Alkaline Electrolyte*, Journal of Electrochemical Society, 152 (7), (2005), pp. A1466-A1473.
Liu, C. G. et al., *Single-Walled Carbon Nanotubes Modified by Electrochemical Treatment for Application in Electrochemical Capacitors*, Journal of Power sources, 160, (2006), pp. 758-761.
Megahed, S. et al., *Lithium-ion Rechargeable Batteries*, Journal of power sources, 51, (1994), pp. 79-104.
Naimer, N. et al., *Zinc-Air Batteries for UAVs and MAVs*, Electric Fuel, (2002), 4 pages.
Ng, S. H. et al., *Single Wall Carbon Nanotube Paper as Anode for Lithium-Ion Battery*, Electrochimica Acta, 51, (2005), pp. 23-28.
Niu, C. et al., *High Power Electrochemical Capacitors Based on Carbon Nanotube Electrodes*, Appl. Phys. Lett., 70(11), (1997), pp. 1480-1482.
Pandolfo, A. g. et al., *Carbon Properties and Their Role in Supercapacitors*, Journal of Power sources, 157, (2006), pp. 11-27.
Shiraishi, S. et al., *Electric Double Layer Capacitance of Highly Pure Single-Walled Carbon Nanotubes (HiPco™ Buckytubes™) in Propylene Carbonate Electrolytes*, Electrochemistry Communications, 4, (2002), pp. 593-598.

(56) References Cited

OTHER PUBLICATIONS

Wang, J. et al., *Capacitance Properties of single Wall Carbon Nanotube/Polypyrrole Composite films*, Composites Science and Technology, 67, (2007), pp. 2981-2985.

Wu, C. et al., *Silver-Carbon Nanocapsule Electrocatalyst for Oxygen Reduction Reaction*, Journal of the Electrochemical Society, 154 (10), (2007), pp. B1058-1062.

Yang, Y. et al., *Particle Size Effects for Oxygen Reduction on Dispersed Silver + Carbon Electrodes in Alkaline Solution*, Journal of Electroanalytical Chemistry, 397, (1995), pp. 271-278.

Zamudio, A. et al., *Efficient Achnoring of Silver Nanoparticles on N-Doped Carbon Nanotubes*, Small, 2, No. 3, (2006), pp. 346-350.

Zhang, G. et al., *A New Air Electrode Based on Carbon Nanotubes and Ag—MnO2 for Metal Air Electrochemical Cells*, Carbon, 42, (2004), pp. 3097-3102.

Zhu, W. H. et al., *New Structures of Thin Air Cathodes for Zinc-Air Batteries*, Journal of Applies Electrochemistry, 33, (2003), pp. 29-36.

Duracell®, Technical Bulletin on Zn-air cells, The Gillette Company, (2004), 15 pages.

Smartgrids, European Commission Energy Research, National Renewable Energy Laboratory, (2011), 3 pages.

Spec—Products—BMI Canada; and Technical Specification for P.T.F.E. Sealing T-Tape (PolyTetraFluoroEthylene) [online] [retrieved Dec. 21, 2016]. Retrieved from the Internet Archive Wayback Machine: <URL: https://web.archive.org/web/20110928151601/htpp:/www.bmicanada.com/products.php?region=en&item=0&disp=3&sort=1&view=28&save=no>. (dated Sep. 28, 2011) 4 pages.

\* cited by examiner

FIG. 1
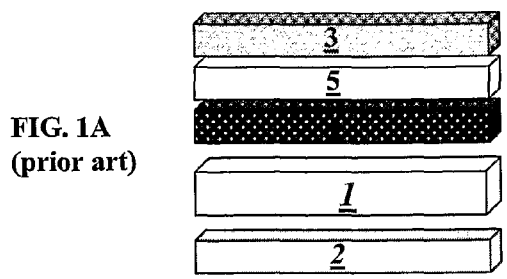
FIG. 1A (prior art)
FIG. 1B
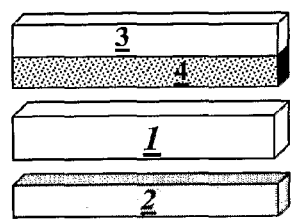
FIG. 1C
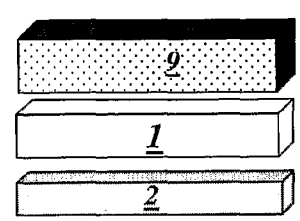
FIG. 1D
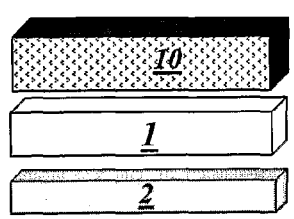
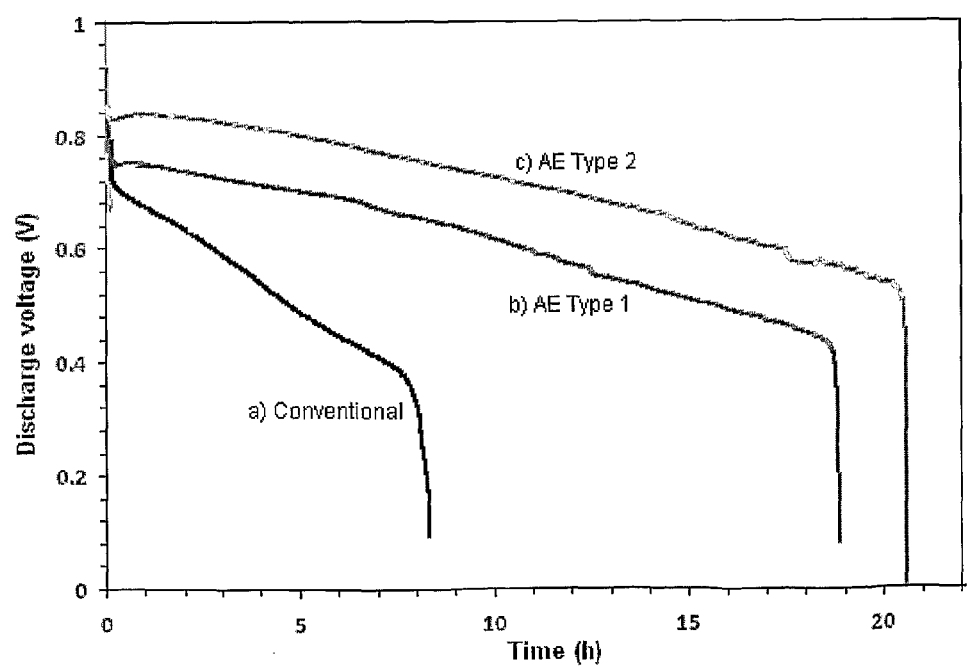
FIG. 2

ELECTRODE MATERIALS FOR METAL-AIR BATTERIES, FUEL CELLS AND SUPERCAPACITORS

CROSS-REFERENCE TO RELATED APPLICATIONS

This application claims the benefit of priority of U.S. provisional application No. 61/095,085, filed Sep. 8, 2008, the contents of it being hereby incorporated by reference in its entirety for all purposes.

FIELD OF THE INVENTION

The present invention refers to the field of electrochemistry, in particular to the electrochemistry of metal-air batteries, fuel cells and electrochemical capacitors.

BACKGROUND OF THE INVENTION

The importance of energy harnessing and storage devices such as solar cells and batteries in this era of high gasoline prices hardly needs to be emphasized. Metal-air batteries combine a metal anode (similar to that used in conventional primary batteries) and an air gas-diffusion electrode (cathode) similar to that used in fuel cells. During operation the metal anode is electrochemically oxidized at the expense of the oxygen from air, which is reduced on the air-gas diffusion electrode (or air electrode, AE). AE possesses two distinct advantages over the conventional metal-oxide cathode in the primary batteries: infinite charge capacity and low weight independent of the capacity. The ampere-hour capacity of the metal-air battery is determined by the amount of the active metal anode, but not by the air electrode. Hence, the specific characteristics (such as Ah/kg and Ah/l) of the metal-air batteries are significantly higher than that of the other electrochemical energy storage systems. Among metal-air batteries, zinc-air batteries offers the highest specific energy (Wh/kg) and energy density (Wh/L) steady performance, and low-cost. Zinc-air batteries contain non-toxic materials and can operate as long as 10 to 14 hours compared to 2 to 4 hours for most rechargeable lithium-ion batteries and can be stored for long periods of time without losing their charge. The lightweight of zinc-air batteries leads to good power density (power per unit of weight or volume), which is very ideal for portable applications.

Zinc-air battery produces electricity by the electrochemical coupling of a reactive metallic zinc anode to an air cathode through a suitable aqueous electrolyte in a cell. During cell operation (discharge) oxygen adsorbed from surrounding air is reduced ($OH^-$) using an oxygen reduction catalyst (ORR) at the cathode (referred to as air electrode, AE) while zinc metal (anode) is oxidized ($Zn^{2+}$), providing a usable electric current flow through an external circuit connected between the anode and the cathode. Since Zn can be electrodeposited from aqueous electrolytes to replenish the anode, zinc-air batteries can be secondary as well as primary batteries.

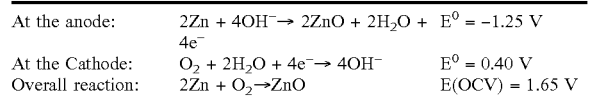

The air-gas diffusion electrode (AE) has one surface exposed to the atmosphere and another surface exposed to the aqueous electrolyte of the cell and is the limiting component in the Zn-air battery cell performance. It is because oxygen reduction at the cathode poses substantial polarization loss, contributing to most of the voltage reduction in cell discharge. Therefore development of AE with facile electrochemical kinetics is of particular importance. Many factors have been established to affect the electrocatalytic performance of AE, (i) the carbonaceous material employed must be conductive, possesses large surface area and have sufficient sites to enhance oxygen reduction reaction (ORR), (ii) the electrocatalyst chosen requires efficient breaking of oxygen bonds, (iii) Internal pore structure of the AE should be optimized for proper channeling of electrolyte and gaseous reactant, and (iv) the hydrophobicity of the AE is tuned to minimize electrolyte flooding. Hence it is recognized that performance of the AE hinges immensely on its construction and the types of carbon materials and electrocatalyst employed.

Owing to the above factors the architectures of the commonly used AE are rather complex (FIG. 1A). In general, it is made up of a hydrophobic layer 3 (carbon) that is in contact with air and a hydrophilic layer 4 (carbon) that is in contact with the electrolyte 1. The hydrophobic layer 3 should be impermeable to the aqueous electrolyte but should be permeable to air. The hydrophilic layer 4 consists of single/multiple oxygen reduction catalyst. Both the layers comprises of a suitable polymer binder that binds the layers on to a conductive metal screen 5 (usually made of Nickel). The hydrophilic layer 4 consists of a physical mixture of carbon and suitable ORR catalyst (noble metals (Pt, Ag) or oxides ($MnO_2$, perovskites)).

Present day Zinc air batteries consists of AE that are constructed by making a thick paste of active carbon, binder and pressing then against a nickel metal screen which acts as both the support and current collector. One side of the Nickel metal screen then consists of a hydrophobic layer (active carbon+binder) the other side consists of hydrophilic layer (active carbon, binder, catalyst).

Carbon nanotubes (CNTs) have attracted much attention in both fundamental and applied study owing to their high surface area, exceptional electrical, mechanical and thermal properties. Due to these properties, CNTs are considered as prospective catalyst support and replacement of active carbon in metal-air batteries and fuel cells. Owing to this, there are studies on the electrocatalytic oxygen reduction on carbon nanotubes with/without catalytic particles (such as Ag—$MnO_2$, Pt, $MnO_2$). It was reported in these studies that using CNT as catalyst support not only improved the conductivity of the AE but also significantly increased the active three-phase interfacial area for oxygen molecular reduction process. In the above studies, the AE were made in the conventional method of mixing CNT with binder and other additives and was placed on a nickel mesh screen.

Thus, a need exists to develop further materials suitable to be used as gas diffusion electrode which overcome at least some of the problems referred to above.

SUMMARY OF THE INVENTION

In a first aspect, the present invention refers to an electrode comprised of a first layer which comprises a mesoporous nanostructured hydrophobic material; and a second layer which comprises a mesoporous nanostructured hydrophilic material arranged on the first layer. In a further aspect, the present invention refers to an electrode comprised of a single layer which comprises a mixture of a mesoporous nanostructured hydrophobic material and a mesoporous nanostructured hydrophilic material; or a single layer comprised of a porous nanostructured material wherein the porous nanostructured material comprises metallic nanostructures which are bound to the surface of the porous nanostructured material.

In a further aspect the present invention is directed to a metal-air battery or a fuel cell or a supercapacitor comprising an electrode described herein.

In another aspect, the present invention refers to a method of manufacturing an electrode comprising arranging or depositing a first layer comprised of a mesoporous nanostructured hydrophobic material on a second layer comprised of a mesoporous nanostructured hydrophilic material.

In still a further aspect, the present invention refers to a method of manufacturing an electrode comprising mixing a mesoporous nanostructured hydrophobic material and a mesoporous nanostructured hydrophilic material; and forming a single electrode layer.

In still a further aspect, the present invention refers to a method of manufacturing an electrode of a porous nanostructured material, wherein the porous nanostructured material comprises metallic nanostructures which are bound to the surface of the porous nanostructured material. The method comprises mixing a porous nanostructured material with a solution comprising a metallic nanostructure precursor to obtain a suspension of the nanostructured material with the solution comprising the metallic nanostructure precursor. In a further step the method comprises chemically reducing the metallic nanostructure precursor to allow precipitation of the nanostructures at the surface of the nanostructured material at a temperature of equal or less than 80° C.

In still a further aspect, the present invention is directed to the use of an electrode as described herein or an electrode manufactured by a method described herein for the manufacture of a metal-air battery or a fuel cell or a supercapacitor.

BRIEF DESCRIPTION OF THE DRAWINGS

The invention will be better understood with reference to the detailed description when considered in conjunction with the non-limiting examples and the accompanying drawings, in which:

FIG. 1 illustrates different configurations of metal-air batteries. In general, a metal-air battery known in the art (FIG. 1A), such as a zinc-air battery is made up of a hydrophobic layer (carbon) 3 that is in contact with air and a hydrophilic layer 4 (carbon) that is in contact with the electrolyte 1. The hydrophobic layer 3 should be impermeable to the aqueous electrolyte 1 but should be permeable to air. The hydrophilic layer 4 consists of single/multiple oxygen reduction catalyst. Both the layers 3, 4 comprises of a suitable polymer binder that binds the layers on to a conductive metal screen 5 (usually made of Nickel). The hydrophilic layer 3 consists of a physical mixture of carbon and suitable ORR catalyst (noble metals (Pt, Ag) or oxides ($MnO_2$, perovskites)). The counter electrode 2 can be made of a metal usually used in metal air batteries, such as zinc or aluminium oxide. FIG. 1B illustrates a metal-air battery described herein using an electrode 3, 4 as described herein. In the electrode 3, 4 a hydrophobic layer 3 and a hydrophilic layer 4 are laminated or stacked on top of each other without the need of any binder material. The nanostructured material which is comprised in the hydrophilic layer can be mixed with catalytic nanostructures or the nanostructured material can bind to such catalytic nanostructures (decorated nanostructured material). In a further embodiment referred to herein and illustrated in FIG. 1C, the hydrophilic electrode material and the hydrophobic electrode material are mixed with each other to form one single layer 9. Also in the embodiment illustrated in FIG. 1C, the nanostructured material which is comprised in the hydrophilic layer can be mixed with catalytic nanostructures or the catalytic nanostructures can be bound to the hydrophilic nanostructured material (decorated nanostructured material). In another embodiment referred to herein and illustrated in FIG. 1D, the electrode material is made of a metal nanostructure decorated nanostructured material and forms a single layer 10. The metal nanostructure decorated nanostructured material can comprise for example a nanostructured material, such as carbon nanotubes. The metal (metallic) nanostructures, such as silver nanoparticles, $MnO_2$ nanoflakes, $MnO_2$ nanoflowers, or $MnO_2$ nanowires; are bound to the surface of this nanostructured material via a linker.

FIG. 2 shows galvanostatic discharge curves of Zn-air cells using a) Conventional, b) AE Type1 (FIG. 1B) (stacked P—COOH bucky papers), and c) AE Type2 (FIG. 1C) (P-&COOH-CNT, 50:50) air cathodes and Zinc foil anode.

As shown in FIG. 20, a nanostructured material (grey vertical bar) comprising linkers which are bound on its surface is mixed with a solution comprising nanostructure precursor(s). In a step of chemically reducing the precursor material at temperatures ≤80° C. the nanostructures form and precipitate on the surface of the nanostructured material by binding to the linker.

FIG. 21 c: Specific capacitance versus wt % of MnO$_2$ nanoflowers and nanotubes mixed with CNT, which indicates that electrodes with 6 wt % of MnO$_2$ obtained highest specific capacitance.

DETAILED DESCRIPTION OF THE PRESENT INVENTION

Figure 3:
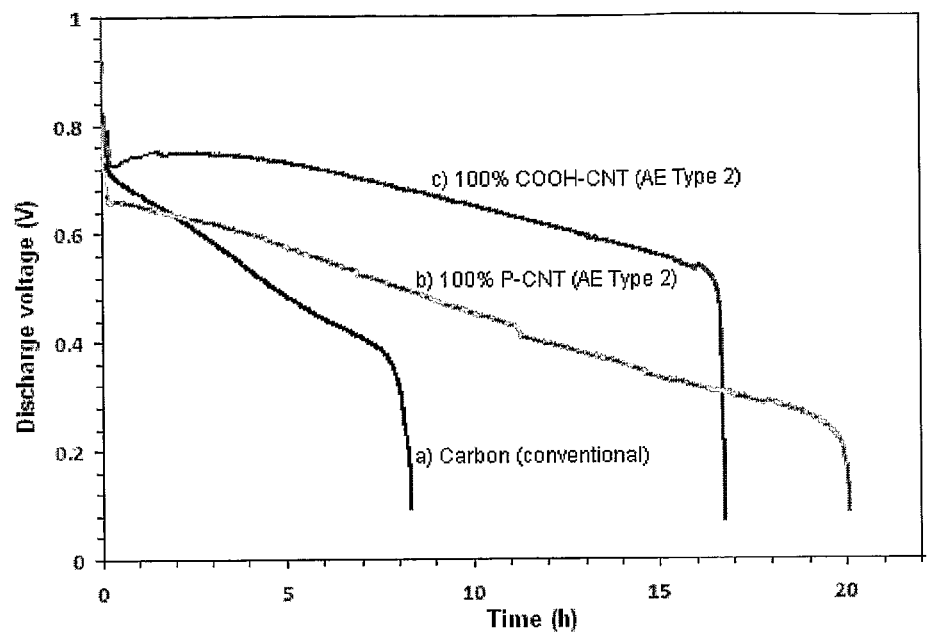
FIG. 3 shows galvanostatic discharge curves of Zn-air cells using a) carbon black (conventional) and AE Type 2 electrodes made of 100% made of b) P-CNT and c) COOH-SWCNT air cathodes and Zinc foil anode.

In a first aspect, the present invention refers to an electrode comprised of a first layer which comprises a mesoporous nanostructured hydrophobic material; and a second layer which comprises a mesoporous nanostructured hydrophilic material arranged on the first layer. In a further aspect, the present invention refers to an electrode comprised of a single layer which comprises a mixture of a mesoporous nanostructured hydrophobic material and a mesoporous nanostructured hydrophilic material; or a single layer comprised of a porous nanostructured material wherein the porous nanostructured material comprises metallic nanostructures bound to its surface.

In the first embodiment in which the electrode is comprised of a first layer comprised or consisting of a mesoporous nanostructured hydrophobic material; and a second layer comprised or consisting of a mesoporous nanostructured hydrophilic material arranged on the first layer, the mesoporous nanostructured hydrophilic material can further comprise catalytic nanostructures which are either physically mixed with the mesoporous nanostructured hydrophilic material or are bound to the surface of the mesoporous nanostructured hydrophilic material.

In a second embodiment, in which an electrode comprised of a single layer comprises or consists of a mixture of a mesoporous nanostructured hydrophobic material and a mesoporous nanostructured hydrophilic material, the mesoporous nanostructured hydrophilic material can further comprise catalytic nanostructures which are either physically mixed with the mesoporous nanostructured hydrophilic material or are bound to the surface of the mesoporous nanostructured hydrophilic material.

In a third embodiment, an electrode comprises or consists of a single layer comprising or consisting of a porous nanostructured material wherein the porous nanostructured material comprises metallic nanostructures which are bound to its surface, i.e. the porous nanostructured material is herein also called decorated nanostructured material or porous decorated nanostructured material.

Nanostructured materials can be easily fabricated in the form of stable membranes by simple filtration, spray deposition or spin-coating processes. Hence the need for additional binders (like PVDF) as they are used in the art for such electrode materials like the one illustrated in FIG. 1A is not needed.

Using the above electrode compositions for example in a metal-air battery, cell performance is markedly improved (~2.5×). The above electrode compositions substantially reduce the size and weight of future devices, such as metal-air batteries, fuel cells or supercapacitors. This is very attractive for portable device applications. For example the weight of a battery can be reduced by at least 50% or more by switching to these electrode compositions, hence the actual device size would become smaller with better portability. These electrode compositions can also make present day non-flexible metal-air batteries in to flexible metal-air batteries which would have a deep impact on printed power applications.

In general, the nanostructured material used in the embodiments referred to herein can be manufactured of any material which can be used in the applications referred to herein. For example, the nanostructured material can be made of a carbon material, a ceramic, glass, such as soda-lime glass, borosilicate glass, acrylic glass, isinglass (Muscovy-glass), aluminium oxynitride, a metal, such as titanium; a metal oxide, a polypyrrole or mixtures of nanostructured materials made of different of the aforementioned materials, to name only a few. In one embodiment, the nanostructured material is made of a carbon material. Examples of carbon materials include, but are not limited to activated carbon, carbon black and graphene. In one example, the nanostructured material is made of TiO$_2$, such as TiO$_2$ nanotubes while in another example carbon nanotubes, such as single-walled carbon nanotubes (SWCNT) are used.

The nanostructured material and nanostructures used in the present invention is porous. The pores of the nanostructured material are either macropores or mesopores. According to IUPAC definition, macropores are considered pores with a size of between about >50 nm to about 5 μm while mesopores have a size of between about 2 nm to about 50 nm. Due to the porous structure the nanostructured material and nanostructures have a high surface area. Nanostructured materials and nanostructures can be characterized by a large surface area which can be at least about 50 m$^2$/g. In one embodiment the surface area of the nanostructured material is about 100, or 200 or 300 m²/g.

Nanostructured material and nanostructure refers to a material with dimensions in the nanometer range. In one embodiment, at least one dimension of the nanostructured material and the nanostructure is less than 100 nm. In another embodiment, a nanostructured material and the nanostructure has a dimension typically ranging from 1 to 100 nm (where 10 angstrom=1 nm=1/1000 micrometer). Nanostructured materials and nanostructures can be classified into the following dimensional types:

Zero dimensional (0D): nanospherical particles. (also called nanoparticles);

One dimensional (1D): nanorods, nanowires (also called nanofibers) and nanotubes; and Two dimensional (2D): nanoflakes, nanoflowers, nanodiscs and nanofilms.

The nanostructure of the nanostructured material and nanostructures can include, but is not limited to a nanotube, a nanoflower, a nanowire (also called nanofiber), a nanoflake, a nanoparticle, a nanodisc, a nanofilm and combinations of the aforementioned nanostructures (e.g. a mixture of nanotubes and nanowires).

The nanotubes can be single-walled (SWNT) or double-walled (DWNT) or multi-wall nanotubes (MWNT). A single-wall nanotube can be defined by a cylindrical sheet with a diameter of about 0.7 to about 10 or 20 nm or with a diameter of <20 nm or <2 nm. They can be several micrometer long, i.e. at least 1 μm or at least 2 μm or between about 1 μm and 5 μm. Double-wall or multi-wall nanotubes consist of numerous cylinders tightly stuck into another.

In one embodiment the nanotubes are made of carbon and can be used as single-wall carbon nanotubes (SWCNT), double-wall carbon nanotubes (DWCNT) or multi-wall carbon nanotubes (MWCNT). Single-wall carbon nanotubes can be described as a graphite plane (so called graphene) sheet rolled into a hollow cylindrical shape so that the structure is one-dimensional with axial symmetry, and in general exhibiting a spiral conformation, called chirality.

As described herein in some embodiments a mesoporous nanostructured hydrophilic material and a mesoporous nanostructured hydrophobic material is used.

The term "hydrophobic" refers in general to a compound or structure which has little affinity to polar solvents, such as water, i.e. it is nonwettable. Such hydrophobic structures or compounds are characterized by not comprising polar groups which are exposed to the outside polar environment, i.e. a polar solvent, such as water. On the other hand, the term "hydrophilic" refers in general to a compound or structure which interacts with polar solvents, in particular with water, or with other polar groups. Such hydrophilic structures or compounds are characterized by comprising polar groups which are exposed to the outside environment, i.e. a polar solvent.

Thus, whether a mesoporous nanostructured material is hydrophilic or hydrophobic depends on the polarity of the groups exposed to the outside environment of the mesoporous nanostructured material or in other words the polarity depends on the surface molecules which the mesoporous nanostructured material presents.

A mesoporous nanostructured material is hydrophobic when it does not comprise any or at least almost no polar groups at its surface.

Hydrophobic nanostructured materials can be characterized as being hydrophobic if they have not been subjected to an oxidative treatment, i.e. they are unoxidized. The use of an "unoxidized" nanostructured material means that the nanostructured material has not been subjected to an oxidative treatment and thus does not comprise any polar groups or substantially no polar groups at its surface. Such oxidative treatments are known in the art and can include, but are not limited to a refluxing treatment with a strong acid or oxidant, such as reflux in $H_2SO_4/HNO_3$ or $KMnO_4$ or $H_2SO_4$ to name only a few, or subjecting the nanostructured material to an electrochemical treatment, or reacting it with double bond-containing molecules, such as an unsaturated carboxylic acid (e.g. acrylic acid) or vinyl pyrrolidone.

In one example, the term "unoxidized" refers to a nanostructured material which has not been subjected to an oxidative treatment and/or has not been functionalized. "Functionalizing" means that a nanostructured material is treated to introduce functional groups at the surface of the nanostructured material. For example, the oxidation with an acid introduces —COOH groups at the surface of the nanostructured material. A functionalization by silanization would introduce silane groups at the surface of the nanostructured material. Compounds used for silanisation can include for example aminosilanes, glycidoxysilanes and mercaptosilanes.

Commercially available nanostructured materials, such as nanotubes or nanowires, made of carbon are normally not oxidized or functionalized and are thus hydrophobic. Untreated, i.e. not oxidized or functionalized, nanostructured materials are often referred to as pristine nanostructured materials.

In contrast, hydrophilic nanostructured materials comprise polar groups at their surface. Such polar groups can be linkers which are bound on the surface of the nanostructured material and thus render it hydrophilic. A linker includes a functional group such as a hydroxyl group, a pyrene, an ester, a thiol, an amine or a carboxyl group. It is also possible that mixtures of different linkers of the aforementioned group are used. Examples of suitable linkers can include, but are not limited to porphyrine (including amine groups) or polyethylene glycol (PEG; also known as poly(ethylene oxide)) (including —OH groups).

In one embodiment, the carboxyl group can be comprised in a linker including, but not limited to formic acid, acetic acid, propionic acid, butanoic acid, pentanoic acid, hexanoic acid, cycloalkane carboxylic acids or benzoic acid. One example includes 4-aminobenzoic acid. Furthermore, a hydroxyl group can be comprised in a linker including, but not limited to phosphoric acid or sulfonic acid.

For example, in one embodiment the hydrophilic nanostructured material is made of a carbonaceous material, such as a carbon nanotube, which carries carboxyl group at its surface. The basic material used for the hydrophobic nanostructured material and the hydrophilic nanostructured material can be the same or different. For example, in one embodiment the material used for the hydrophobic nanostructured material is pristine carbon nanotubes while the material used for the hydrophilic nanostructured material is carbon nanotubes which have been oxidized and thus carry a linker comprising a carboxyl group —COOH at its surface. In another embodiment, the hydrophobic nanostructured material can be hydrophobic $TiO_2$ nanotubes while the hydrophilic nanostructured material can be carbon nanotubes which have been oxidized and thus carry a linker comprising a carboxyl group —COOH at its surface.

It was demonstrated that the use of hydrophobic and hydrophilic nanostructured materials alone without the addition of any catalyst material, such as noble metal catalysts, is suitable as electrode material for example for a metal-air battery as shown in FIGS. 1B and 1C.

In a further embodiment, a catalyst material is added to the mesoporous hydrophilic nanostructured material. The catalyst material can either be simply mixed with the mesoporous hydrophilic nanostructure material to form a physical mixture or the catalyst material can be bound to the mesoporous hydrophilic nanostructured material. The catalyst material can be mixed in form of nanostructures, such as nanoparticles, nanoflowers, nanowires or nanoflakes with the mesoporous hydrophilic nanostructured material or can be bound to the mesoporous hydrophilic nanostructured material in form of nanostructures, such as nanoparticles, nanoflowers, nanowires or nanoflakes. For example, a physical mixture of catalytic nanostructures with a nanostructured material can comprise between about 0.5 wt. % to about 10 wt. %, or between about 0.5 wt. % to about 4 wt. % of catalytic nanostructures based on the total weight of the nanostructured material.

In still a further embodiment, the catalyst material also forms part of the porous nanostructured material wherein the catalyst material in that embodiment is in form of metallic nanostructures which are bound to the porous nanostructured material to form a single electrode material layer as illustrated for example in FIG. 1D in which the single electrode layer 10 forms part of a metal-air battery. Examples of such metallic nanostructures include, but are not limited to noble metal nanoparticles, such as silver nanoparticles, or $MnO_2$ nanostructures, such as $MnO_2$ nanowires, $MnO_2$ nanoflakes, or $MnO_2$ nanoflowers.

The catalyst material can be a metallic catalyst material. Any metal that can be used as catalyst material for an electrode can also be used herein. In one embodiment the metal includes, but is not limited to a noble metal, a metal oxide, a metal alloy, an intermetallic, or mixtures of the aforementioned metals.

Noble metals include silver, palladium, gold, platinum, iridium, osmium, rhodium and ruthenium. In one embodiment silver, palladium, gold, platinum, mixtures thereof or alloys thereof can be used. Examples of noble metal alloys include alloys of platinum and iridium, Pd—Pt, Pd—Rh, Pd—Pt—Rh, silver or gold together with calcium, to name only a few. Alloys of noble metals are used for example to obtain erosion-resistant electrode materials.

In another embodiment metal oxides can be used. A metal oxide can include, but is not limited to $PtO_2$, $V_2O_3$, $V_2O_5$, $Nb_2O_5$, $NiO_2 \cdot xH_2O$, $LiCoO_2$, $LiFeO_2$, $LiMn_2O_3$, $Li_2MoO_4$, $Li_2TiO_3$, $MnO_2$, $Ag—MnO_2$, $Al_2O_3$, $MoO_3$, $TiO_2$, $SiO_2$, $ZnO_2$, $SnO_2$, $Fe_2O_3$, NiO, $Co_3O_4$, CoO, $Nb_2O_5$, $W_2O_3$, mixtures and alloys thereof. The metal oxide can be either stoichiometric or non-stoichiometric (e.g. $Me_{n-x}O_{m-y}$, $0<x<1$; $0\leq y\leq 1$; $1\leq m\leq 5$).

Catalytic alloys can include but are not limited to alloys which are made of elements selected from the group of elements of group 10, 11, 12, 13, 14 and 16 of the periodic system (IUPAC nomenclature recommendation of 2006 according to Fluck and Heumann, periodic system 2007 Wiley-VCH GmbH & Co. KGaA, Weinheim, 4$^{th}$ edition). Group 10 includes nickel (Ni), palladium (Pd) and platinum (Pt); group 11 includes copper (Cu), silver (Ag) and gold (Au); group 12 includes zinc (Zn), cadmium (Cd) and mercury (Hg); group 13 includes boron (B), aluminium (Al), gallium (Ga), indium (In) and thallium (T1); group 14 includes carbon (C), silicon (Si), germanium (Ge), tin (Sn) and lead (Pb); and group 16 includes oxygen (O), sulfur (S), selenium (Se), tellurium (Te) and polonium (Po).

In one embodiment, the alloy is made of elements including, but not limited to lithium/aluminium, Au, Pt, Pd, Cu, In, InSe, CuSe and $SnS_2$.

In another embodiment, the metal used as catalytic material for the electrode is an intermetallic. An intermetallic is a composition which consists only of metal atoms which are bound to each other via metallic bonds in non-stoichiometric ratios. Examples of such intermetallics include Ag—Ni or Ag—Au.

The size of the nanostructures can be readily controlled by a method described herein and is in the nanometer range. In embodiments in which the nanostructures, such as nanoparticles are mixed with the mesoporous nanostructured hydrophilic material, the size of the nanostructures is equal or below 40 nm or is between about 0.5 nm to about 40 nm, or is between about 2 nm to about 40 nm.

It was demonstrated herein that a mesoporous nanostructured hydrophilic material or a porous nanostructured material which comprise metallic nanostructures bound to its surface (i.e. decorated nanostructured materials) form more efficient electrode materials or parts of electrode materials if the maximal size of the nanostructures is between about 0.5 nm to about 20 nm.

Since the dimension of a nanoparticle is not always regular, i.e. perfectly spherical, the above size refers for nanoparticles to the maximal dimension of the nanoparticle in any direction. In other embodiments, the size of the nanoparticles, nanoflakes, or nanoflowers (irrespective of whether they are bound to the nanostructured material or mixed with it) is between about 0.5 to 20 nm, or about 0.5 to 15 nm, or about 0.5 to 12, or about 0.5 to 5 nm, or about 5 nm to about 12 nm or about 5 to about 15 nm. In case of using nanowires or other elongated nanostructures, the maximal dimension in any direction is also between about 0.5 to 20 nm, or about 0.5 to 15 nm, or about 0.5 to 12, or about 0.5 to 5 nm, or about 5 nm to about 12 nm or about 5 to about 15 nm.

Furthermore, the method described herein also allows manufacturing nanostructures which have a very narrow size distribution. Thus, in one embodiment, the nanostructure size distribution for nanostructures, such as nanoparticles with a size of between about ≥12 to about 20 nm is about ±5 nm. The nanostructure size distribution for nanoparticles with a size of between about ≥5 nm to <12 nm is about ±3 nm. The nanostructure size distribution for nanostructures with a size of between about 2 nm to <5 nm is about ±1 nm. For example, a silver nanoparticle with a size of 1 nm is estimated to consist of about 31 silver atoms. Smaller nanostructures, such as nanoparticles have the advantage of not blocking the pores of the nanostructured material and thus do not decrease the surface area of the nanostructured material. A high surface area can increase the conductivity of the decorated nanostructured material.

Instead of simply mixing the nanostructures with the mesoporous nanostructured hydrophilic material it is also possible to bind the nanostructures to the surface of the mesoporous nanostructured hydrophilic material like for the porous nanostructured material (decorated nanostructured material) used for the single electrode layer as illustrated in FIG. 1D.

The nanostructures bound to the surface of the nanostructured material are chemically bound or fixed to the nanostructured material via a linker. A linker is a molecule connecting the surface of the nanostructured material with the nanostructure. A linker includes a functional group such as a hydroxyl group, a pyrene, an ester, a thiol, an amine or a carboxyl group. It is also possible that mixtures of different linkers of the aforementioned group are used to bind nanostructures to the surface of the nanostructured material. Examples of suitable linkers can include, but are not limited to porphyrin (including amine groups) or polyethylene glycol (PEG; also known as poly(ethylene oxide)) (including —OH groups).

In one embodiment, the carboxyl group can be comprised in a linker including, but not limited to formic acid, acetic acid, propionic acid, butanoic acid, pentanoic acid, hexanoic acid, cycloalkane carboxylic acids or benzoic acid. One example includes 4-aminobenzoic acid. Furthermore, a hydroxyl group can be comprised in a linker including, but not limited to phosphoric acid or sulfonic acid. Using such linkers to connect the nanostructures to the surface of the nanostructured material can enhance the device energy density while reducing the internal resistance. For example, avoiding segregation/agglomeration of the catalysts in metal-air batteries can accelerate the oxygen reduction reaction and improving the device performance.

Figure 17:
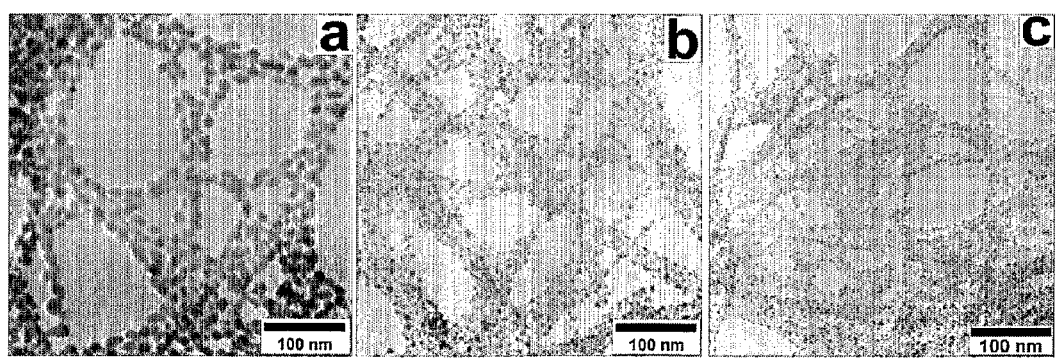
FIG. 17 shows TEM images of Ag-CNT (silver decorated carbon nanotubes) with Ag nanoparticle sizes of (a) about 13 nm (b) about 4 nm and (c) 3 nm.
Figure 18:
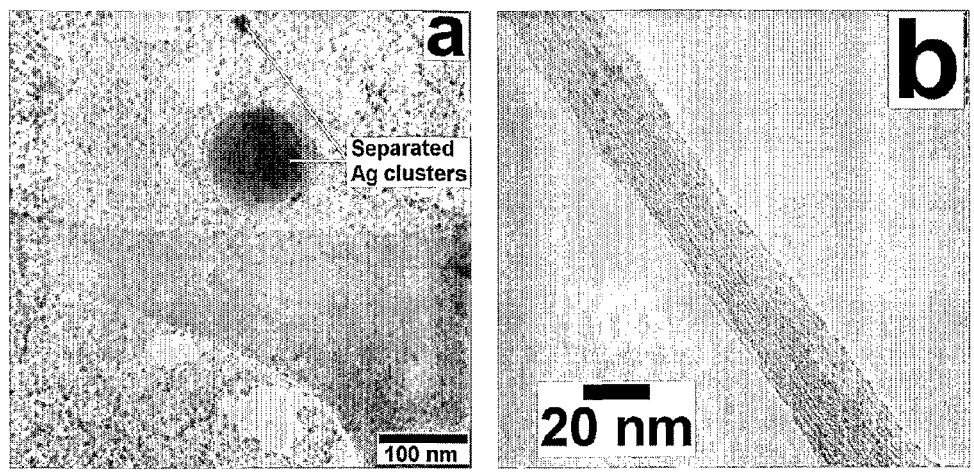
FIG. 18 shows the effect of a varying metal precursor concentration (in this case AgNO$_3$) to the silver decoration of the nanostructured material. (a) Large colloidal silver clusters formation at 0.15 M (Ag-CNT6) and (b) Average size 1 nm at 0.05 M (AgCNT2).

Further improvement can be obtained in case the nanostructures are evenly distributed at the surface of the nanostructured material such as shown for example in FIG. 17 (FIG. 17 shows nanoparticles as example for nanostructure). Evenly distributed also means that the nanostructures do not form separate clusters as shown in FIG. 18(a). Therefore, in one embodiment, the nanostructures are evenly distributed at the surface of the nanostructured material. In one embodiment, between about 5% to about 80% of the surface of the nanostructured material is covered with nanostructures. In another embodiment at least 30% or 40% or 50% or 60% are covered with nanostructures.

In one embodiment, (hydrophilic) silver decorated carbon nanotubes forming a layer which is arranged on a layer of (hydrophobic) pristine CNT is used (i.e. CNTs which have bound Ag particles at its surface) as air electrode material for a metal-air battery. Owing to the hydrophobic and hydrophilic natures of the CNTs, high surface area pristine CNT (hydrophobic) will absorb oxygen from air and the pores of this will not be wetted by the electrolyte. On the other hand the aqueous electrolyte will preferentially wet the hydrophilic CNT (high surface) on to which Ag-nanoparticles are dispersed as catalyst that will enhance the oxygen reduction reaction.

In one embodiment, silver decorated single walled carbon nanotubes are used. In other embodiments $MnO_2$ decorated carbon nanotubes are used, wherein the $MnO_2$ nanostructures can be $MnO_2$ nanoflakes, $MnO_2$ nanoflowers, or $MnO_2$ nanowires.

The nanostructured material described above can be formed into a membrane by filtering the material over a filtration membrane which results in a thin sheet or membrane which can be peeled of a form the electrode material or can form part of an electrode material.

The electrode materials referred to herein which are either made of a mesoporous nanostructured hydrophobic material arranged on a layer of a mesoporous nanostructured hydrophilic material, or a single layer made of a mixture of a mesoporous nanostructured hydrophobic material and a mesoporous nanostructured hydrophilic material, or a single layer of a porous nanostructured material comprising metallic nanostructures bound to its surface can be used as electrode material for the air electrode of a metal air battery or as electrode in a fuel cell or as electrode in a supercapacitor.

Metal-air batteries are characterized by a high energy density, a flat discharge voltage and long shelf life. In metal-air batteries, the reactive anode and air electrode result in an inexhaustible cathode reactant. Ampere-hour capacity in the anode, as well as the handling and storage of reaction products determines capacity limit. There are primary, reserve, and both electrically and mechanically rechargeable metal-air batteries. While the mechanically rechargeable battery is much like a primary battery, the electrically rechargeable type needs a third or bifunctional electrode for oxygen evolution. Examples of metal air batteries include, but are not limited to zinc-air batteries, lithium-air batteries and aluminium-air batteries.

Like lithium-ion batteries, metal-air batteries normally also use an electrode made of carbonaceous material. This carbon electrode can be replaced by an electrode material described herein. An illustrative example of a metal-air battery using one of the electrode materials referred to herein is illustrated in FIGS. 1B, 1C and 1D.

In FIG. 1B the cathode is comprised of a mesoporous nanostructured hydrophobic material 3 arranged on a layer of a mesoporous nanostructured hydrophilic material 4. In FIG. 1C the cathode is comprised of a mixture of a mesoporous nanostructured hydrophobic material and a mesoporous nanostructured hydrophilic material 9. In FIG. 1C, the cathode is comprised of a porous nanostructured material comprising metallic nanostructures bound to its surface.

The electrode materials referred to herein can also be used as electrode material in a fuel cell. A fuel cell is an electrochemical device that converts the chemical energy of a fuel (hydrogen, natural gas, methanol, gasoline, etc.) and an oxidant (air or oxygen) into electricity. A fuel cell comprises a positively charged anode and a negatively charged cathode. The fuel cell also comprises an ion-conducting material. In other words, fuel cell construction generally consists of a fuel electrode (anode) and an oxidant electrode (cathode) separated by an ion-conducting material, such as an ion-conducting membrane (e.g. a Nafion® membrane). Oxygen passes over one electrode and hydrogen over the other, generating electricity, water and heat.

In more detail, in general, in a fuel cell a proton conducting solid membrane (PEM) is surrounded by two layers, a diffusion and a reaction layer. Under constant supply of hydrogen and oxygen the hydrogen diffuses through the anode and the diffusion layer up to the catalyst (normally a noble metal catalyst), the reaction layer. The reason for the diffusion current is the tendency of hydrogen oxygen reaction. Two main electrochemical reactions occur in the fuel cell. One reaction occurs at the anode (anodic reaction) and the other at the cathode. At the anode, the reaction releases hydrogen ions and electrons whose transport is crucial to energy production. The hydrogen ion on its way to the cathode passes through the PEM while the only possible way for the electrons is through an outer circuit. The hydrogen ions together with the electrons of the outer electric circuit and the oxygen which has diffused through the porous cathode reacts to water. The water resulting from this reaction can be extracted from the system by the excess air flow. This process occurs in all types of fuel cells, such as polymer exchange membrane fuel cell (PEMFC), solid oxide fuel cell (SOFC), alkaline fuel cell (AFC), molten-carbonate fuel cell (MCFC), phosphoric-acid fuel cell (PAFC) or direct-methanol fuel cell (DMFC).

For example, in one embodiment the anode of a fuel cell can be formed of a layer of a mesoporous nanostructured hydrophobic material arranged on a layer of a mesoporous nanostructured hydrophilic material, wherein the mesoporous nanostructured hydrophilic material comprises a metallic catalyst, such as noble metal nanostructures, which are either mixed with the mesoporous nanostructured hydrophilic material or are bound to the surface of the mesoporous nanostructured hydrophilic material. In another embodiment, the anode of the fuel cell is comprised of a single layer of a mesoporous nanostructured hydrophobic material mixed with a mesoporous nanostructured hydrophilic material, wherein the mesoporous nanostructured hydrophilic material comprises a metallic catalyst, such as noble metal nanostructures, which are either mixed with the mesoporous nanostructured hydrophilic material or are bound to the surface of the mesoporous nanostructured hydrophilic material. In a further embodiment, the fuel cell is comprised of a single layer of a porous nanostructured material comprising metallic nanostructures, such as noble metal nanoparticles, bound to the surface of the porous nanostructured material. In all cases, the cathode of the fuel cell can be comprised of a layer of a mesoporous nanostructured hydrophobic material arranged on a layer of a mesoporous nanostructured hydrophilic material or a single layer of a mesoporous nanostructured hydrophobic material mixed with a mesoporous nanostructured hydrophilic material. The cathode of the fuel cell would in this case not comprise any catalytic material, such as catalytic nanostructures.

Electrochemical capacitors (ECs) often called as "supercapacitors" are electrical devices with highly reversible charge storage and delivery capabilities. Whereas a regular capacitor consists of conductive foils and a dry separator, the supercapacitor crosses into battery technology by using special electrodes and an electrolyte. Electrochemical capacitors differ from batteries in that they do not store energy in redox reactions that occur in the electrode structure. Electrochemical capacitors store energy through electrostatic interactions that occur in the electrode and electrolyte interface region, also known as the double layer. ECs have properties complementary to secondary batteries. Such an EC can be composed of electrode based on the electrode materials referred to herein and an electrolyte. ECs can employ both aqueous and non-aqueous electrolytes in either liquid or solid state.

One embodiment described herein refers to a supercapacitor comprising an electrode material as described herein. The electrode material can be used for one electrode or both electrodes of the supercapacitor. In one embodiment silver decorated carbon nanotubes are used as electrode material and in another embodiment $MnO_2$ decorated carbon nanotubes are used wherein the $MnO_2$ nanostructure can be made of $MnO_2$ nanoflakes, $MnO_2$ nanoflowers, or $MnO_2$ nanowires.

The separate layers forming the electrode can be arranged or coated onto a support material (in other words a substrate), such as a paper-like free standing film before being used as electrode material in metal-air batteries or fuel cells. The paper-like free standing film can be a bucky paper or a sprayed or printed active material on a flexible conducting substrate, such as Al coated PET; or a free standing film of a nanostructured material.

In one embodiment, due to their structure, the electrode layers do not comprise a polymeric binder or do not comprise poly(1,1-difluoro-1,2-ethanediyl) (PVDF).

The new electrode materials can form electrodes with a thickness for each layer of at least 10 µm, or with a thickness of between about 10 µm to about 30 µm. In one embodiment the thickness of a layer of the electrode is about 20 µm. That means that a double layered structure as the one illustrated in FIG. 1B can have a thickness of between about 20 µm to about 60 µm.

In another aspect, the present invention refers to a method of manufacturing an electrode comprising arranging or depositing a first layer comprised of a mesoporous nanostructured hydrophobic material on a second layer comprised of a mesoporous nanostructured hydrophilic material. In a further aspect, the present invention refers to a method of manufacturing an electrode comprising mixing a mesoporous nanostructured hydrophobic material and a mesoporous nanostructured hydrophilic material, and subsequently forming a single electrode layer. In still a further aspect, the present invention refers to a method of manufacturing a porous nanostructured material which comprises metallic nanostructures bound to its surface. This method comprises mixing a porous nanostructured material with a solution comprising a metallic nanostructure precursor to obtain a suspension of the nanostructured material with the solution comprising the metallic nanostructure precursor and chemically reducing the metallic nanostructure precursor to allow precipitation of the nanostructures at the surface of the nanostructured material at a temperature of equal or less than 80° C.

In general, nanostructured materials in any form can be formed into a layered structure by methods known in the art including, but not limited to filtering, casting, spin coating, roll-casting, spraying and inkjet printing. In one embodiment, the different layers are formed by filtering of the nanostructured material through a filter membrane. In one embodiment, the layers can be formed separately and be arranged on each other or stacked on each other after their manufacture or the layers are arranged on each other in a continuous manner by spraying or filtering or by use of a plasma method. For example, using a plasma method, the first layer can be deposited on a support material followed by plasma deposition of the next layer directly on the first layer. For example, the first layer can be either a hydrophobic layer or hydrophilic layer.

Nanostructured materials, such as carbonaceous nanostructured materials (e.g. carbon nanotubes) can also be formed by methods known in the art, including but not limited to electric arc discharge methods, laser vaporization methods, chemical vapor deposition methods or hydrothermal synthesis.

To obtain a nanostructured hydrophilic material by introducing a polar group, i.e. a linker, at the surface of the nanostructured material, the pristine and thus hydrophobic nanostructured material is subjected to an oxidative treatment, or sintering at temperatures <500° C., or refluxing in inorganic polar solvents, or plasma treatment, such as $N_2$ or $H_2$ or $O_2$ plasma treatment. In another embodiment, the nanostructured material is subjected to a treatment using irradiation with gamma-rays and subsequent contacting of the gamma-irradiated nanostructured material with an unsaturated carboxylic acid. The gamma-rays can create free radicals at the surface of the nanostructured material which readily reacts with the unsaturated carboxylic acid to form a linker molecule immobilized or bound on the surface of the nanostructured material.

The unsaturated carboxylic acid can be an unsaturated carboxylic acid or derivatives thereof. To avoid that the distance between the nanoparticle and the nanostructured material becomes too great, the unsaturated carboxylic acid forming the linker molecule comprises equal or less than 12 C-atoms.

In one embodiment, the unsaturated carboxylic acid is an acrylic acid or derivatives thereof. Examples of acrylic acids or derivatives thereof which can be used include, but are not limited to acrylic acid, methacrylic acid, methyl methacrylic acid, ethacrylic acid, alpha-chloroacrylic acid, alpha-cyano acrylic acid, beta methyl-acrylic acid (crotonic acid), alphaphenyl acrylic acid, sorbic acid, alpha-chloro sorbic acid, angelic acid, cinnamic acid, p-chloro cinnamic acid, itaconic acid, citraconic acid, mesaconic acid, glutaconic acid, aconitic acid, maleic acid, fumaric acid, or tricarboxy ethylene.

In the embodiment in which the mesoporous nanostructured hydrophobic material and the mesoporous nanostructured hydrophilic material are mixed together the ratio of mixing is between about 10 (mesoporous nanostructured hydrophobic material) wt. %:90 wt. % (mesoporous nanostructured hydrophilic material) to about 90:10 wt % based on the total weight of both materials together. In a further embodiment, the mixing ratio is between about 30:70 wt. %, or 70:30 wt. %, or 50:50 wt. % based on the total weight of both materials together.

The method of forming the electrode can further include arranging the layers or single layers referred to herein on a support material. In case the electrode material referred to herein forms part of a metal-air battery, the cathode is formed of an electrode material referred to herein and is arranged on the electrolyte layer of the metal-air battery which is already in contact with the anode layer or is arranged on the anode layer after it has been put together with the cathode layer.

In the following it is referred to the method of manufacturing a porous nanostructured material which comprises metallic nanostructures bound to its surface. This method comprises mixing a porous nanostructured material with a solution comprising a metallic nanostructure precursor to obtain a suspension of the nanostructured material with the solution comprising the metallic nanostructure precursor and chemically reducing the metallic nanostructure precursor to allow precipitation of the nanostructures at the surface of the nanostructured material at a temperature of equal or less than 80° C.

In one embodiment in which a noble metal nanostructure precursor is used the temperature for the chemical reduction step is below 60° C. or below 50° C. In another embodiment, the temperature is between about 15° C. to about 30° C. or between about 15° C. to 25° C. or is about 0° C., 5° C., 10° C., 15° C., 20° C., 25° C., 30° C., 35° C., 40° C., 45° C., 50° C., 55° C. or below 60° C. The reaction conditions for the above method can be adapted such as to form nanostructures with a maximal dimension or size of about 40 nm or 20 nm, or a size of between about 0.5 nm to about 20 nm or any other size referred to herein.

One option to adapt the reaction conditions such as to form nanostructures with the indicated sizes is to adapt the concentration of the metallic nanostructure precursor in the suspension, i.e. in the mixture of nanostructured material and metallic nanostructure precursor. In general, the concentration of precursor materials can be in the range of between about 0.001 M to about 1 M. In one embodiment, the concentration range of noble metal precursor material is in the range of between about 0.01 M to about 1 M, while in another embodiment the concentration range of the metal oxide precursor material can be in the range of between about 0.001 M to about 0.1 M.

The chemical reduction can be achieved by any one of the following methods. Chemical reduction can be achieved for example by adjusting the pH in the suspension comprising the nanostructured material and the metallic nanostructure precursor. Another method of chemical reduction is by heating the suspension in a reducing atmosphere, such as heating in an 5% $H_2/N_2$ or 5% $H_2/Ar$ atmosphere at a temperature <500° C. for 4 to 8 hours; or by using a chemical reducing agent, such as sodium borohydride ($NaBH_4$) or other metal hydrides, such as $CaH_2$ or $MgH_2$.

In one embodiment the pH of the suspension comprising the nanostructured material and the noble metal nanostructure precursor (e.g. noble metal nanoparticle precursor) or metal oxide nanostructure precursor is adapted to allow chemical reduction of the metallic nanostructure precursor, such as a noble metal nanostructure e precursor by adapting the pH to be in a range of between about 1 to 10, or 3 to 10, or 4 to 10. In another embodiment, the pH can be in a range of between about 1 to 7.5 and 1 to 10. For example, in case of using a silver nanostructure precursor material the pH is adjusted or adapted to be in a range of between about 4 to 8 or between about 4.3 to <7.3. In another example in which a gold nanostructure precursor is used, the pH is adjusted to be in a range of between about 3 to 10, or 3.5 to 10, or 4 to 10. In case of using a platinum nanostructure precursor the pH is adjusted to be in a range of between about 4 to 10 or between about 4 to 9. In case of using a metal oxide nanostructure precursor, such as a manganese nanostructure precursor, the pH is adjusted to be in a range of between about 1 to 7. Thus, in case of adjusting the pH chemical reduction is achieved by using a reducing agent, such as an acid or a base. Examples include, but are not limited to NaOH, $NH_3$, HCl, $HClO_4$, $H_2SO_4$ to name only a few. In general, any known acid or base can be used to adjust the pH of the suspension.

The reaction time or incubation time of the nanostructure material with the nanostructure precursor also influences the size of the nanostructures formed. In general the reaction time is between about 5 or 10 or 15 minutes to about 120 minutes. In another embodiment, the reaction time is between about 15 minutes to about 60 minutes.

A further factor which can influence the size of the nanostructures formed is the concentration of the nanostructure precursor in the starting solution before mixing with the nanostructured material. In one embodiment, the concentration of the nanostructure precursor is between about 3 mM to about 150 mM, or at least 3 mM, or between about 3 mM to about 6.5 or 6.3 mM, or between about 3 mM to about 100 mM or below 150 mM. The method described herein allows manufacturing decorated nanostructured material wherein the nanostructures bound to the surface of the nanostructured material have a narrow size range as already outlined further above.

Nanostructure precursor materials for the above materials are known in the art. Different examples of precursor materials include metal chlorides, such as noble metal chlorides; metal nitrates, such as noble metal nitrates, metallic alkoxides, organometallic precursors, or metal acetates, to name only a few. Examples of noble metal nanostructure precursor and metal oxide nanostructure precursor include, but are not limited to $AgNO_3$, $[Ag(NH_3)_2]^+$ (aq), $AuCl_3$, $HAuCl_4 \cdot 3H_2O$, $H_2PtCl_6 \cdot 6H_2O$, $H_2PdCl_6 \cdot 6H_2O$, $Mn(NO_3)_2$, or $KMnO_4$. For example, precursor for $TiO_2$ nanostructures can be metallic alkoxides or organometallic precursors. Examples of titanium alkoxides can include, but are not limited to titanium methoxide, titanium ethoxide, titanium isopropoxide, titanium propoxide and titanium butoxide.

In general, the molar ratio of metal nanostructure precursor to nanostructured material can be in the range of between about 0.05 to about 0.6 or between about 0.1 to about 0.55. In one embodiment, the molar ratio of a nobel metal nanostructure e precursor, such as silver nanostructure precursor, to nanostructured material is between 0.18 to about 0.54. In another embodiment, the molar ratio of metal oxide nanostructure precursor to nanostructured material is between about 0.1 to about 0.5.

Before being mixed with the nanostructure precursor, the nanostructured material is dispersed in a solvent appropriate for the respective nanostructured material at a concentration of between about 0.1 to about 1 mg/ml. Such solvents are known in the art. For example, carbon nanostructured materials or $MnO_2$ nanostructured materials can be easily dissolved in an aqueous solution, e.g. water. Other suitable solvents which can be used herein include alcohols, such as ethanol, isopropanol; ethylene glycol and acetone.

Figure 16:
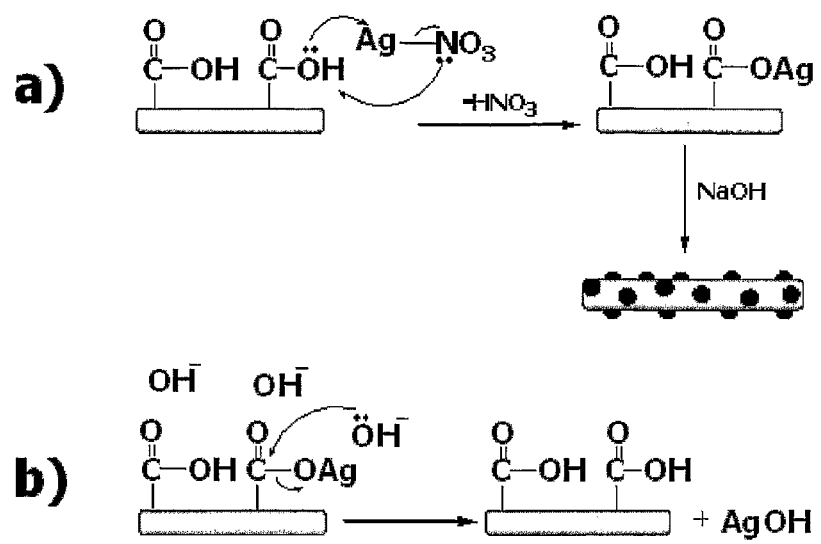
FIG. 16 shows proposed reaction mechanisms for (a) the deposition of silver nanocrystals at carboxyl group of SWCNTs and (b) the resolution of silver hydroxide from SWCNTs surfaces at high pH.

The nanostructures which form during chemical reduction bind to the linker during precipitation as illustrated for example in FIG. 16. In the embodiment illustrated in FIG. 16, $AgNO_3$ is used as noble metal nanoparticle precursor which is chemically reduced using $HNO_3$ thus forming Ag which binds to the nanostructured material via the carboxyl group of the linker. In another embodiment $KMnO_4$ is use as metal oxide nanostructure precursor which is reduced to $MnO_2$ nanostructure which also bind to the nanostructured material via a linker comprising a carboxylic group.

As previously mentioned, to manufacture a membrane made of the decorated nanostructured material referred to herein the decorated nanostructured material can be washed and afterwards can be sieved through a filtration membrane. Afterwards, the membrane formed of the decorated nanostructured material can be peeled of the filter membrane as freestanding membrane and may be directly used as electrode material. It is also possible to mix the decorated nanostructured material with other components which are to be used in the electrode material before sieving it through a filtration membrane to obtain the electrode material. For example, the decorated nanostructured material can be mixed with untreated and/or unoxidized nanostructured material.

In a further aspect, the present invention refers to the use of an electrode as described herein or an electrode manufactured according to a method described herein for the manufacture of an electrode of a metal-air battery or a fuel cell or a supercapacitor.

The inventions illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

EXPERIMENTAL SECTION

1. Air Electrode (AE) Fabrication for Metal-Air Battery

Conventional AE (FIG. 1A) were prepared by adhering a mixture of activated carbon and polyvinylidene difluoride (PVDF) binder onto either side of a Nickel mesh screen. A Teflon® piece was placed on top of the AE to act as a hydrophobic layer in addition to the carbon. The layers of the AE Type 1 (FIG. 1B) and 2 (FIG. 1C) electrodes were prepared for the assembly of the cathode of a metal-air battery. The layers for the assembly of the different kinds of electrodes (AE Type 1 and AE Type 2) were prepared by the following, the COOH-SWCNT (Carbon Solutions Inc.) or Ag-decorated SWCNT suspension (0.2 mg/ml in deionized water) or a mixture of P(pristine) SWCNT and COON-SWCNT (P/COOH-SWCNT) were filtered through a filter membrane (Whatman, 20 nm pore size, 47 mm diameter). The SWCNT falls through the pores and was trapped on the surface of the filter, forming an interconnected network. After drying, the SWCNT network can be peeled off from the filter as a freestanding thin film of thickness of approximately 20 μm, and was directly used as material for the electrode. Circular pieces of these air cathodes were punched out using a die set (16 mm).

2. Zinc-Air Cell Assembly

Anode represented the source of zinc and either metallic zinc or zinc powder mixed with PVDF binder was used. The anode was cut in to circular pieces (13 mm) and stacked with KOH impregnated PVA as the electrolyte and the Air Electrode (AE). AE type 1 (FIG. 1B) electrode was constructed by placing the COOH-SWCNT bucky paper in contact with the electrolyte and placing on top of it P-CNT bucky paper. AE type 2 (FIG. 1C) electrode involved a single bucky paper consisting of a homogeneous mixture of COOH-SWCNT and P-SWCNT.

3. Electrochemical Testing

Galvanostatic discharge curves of the assembled zinc-air battery was collected at a constant current of 1 mA using a computer controlled Macpile (Biologic, France and EG&G, USA, Model 263A). In the case of conventional carbon electrode the electrical contact to AE was made at the Ni-metal screen. Whilst, electrical contacts on AE type 1 (FIG. 1B) and 2 (FIG. 1C) were made directly to the bucky paper and to the zinc anode. It is to be mentioned that the CNT was used both as the active electrode material and a current collector in this study. The open-circuit voltage (OCV) of freshly assembled cells were in the range 1.4 to 1.5 V.

4. Effect of AE Architectures

The effectiveness of CNTs in different AE architecture was compared with the baseline performance of activated carbon black mixed with polyvinylidene fluoride (PVDF) binder on a Ni mesh AE. The discharge profile of a Zn-air battery constructed with the AEs made up of P-SWCNT, COOH-SWCNT using air electrode configuration AE Type 1 (FIG. 1B) and AE Type 2 (FIG. 1C) are shown in FIG. 2. As compared to carbon, it is seen that the zinc air battery consisting of SWCNTs made with AE type 1 (FIG. 1B) and type 2 (FIG. 1C) architectures showed better cell performance (in terms of cell voltage and discharge time). The improvement observed was 2.5× the performance of the conventional carbon-black based electrode. Amongst the air electrodes made of SWCNT, AE Type 2 (FIG. 1C) electrode composed of a single bucky paper consisting of pristine SWCNT (P-SWCNT) and COOH-SWCNT exhibited the best cell performance, with discharge voltage of 0.8 V and cell life of 20.5 h as compared to carbon (0.5 V, 8 h). AE Type 2 (FIG. 1C) electrode made of COOH-SWCNT (hydrophilic) showed a higher discharge voltage (about 0.75 V) as compared to the one made of P-CNT (0.6 V). This may be attributed to the differential wetting nature of these two SWCNT electrodes by electrolyte due to the varying hydrophobic/hydrophilic characteristics of these SWCNT. AE type 1 (FIG. 1B) architecture electrode with two bucky papers made of P-SWCNT and COOH-SWCNT showed a stable voltage (0.7 V) and a discharge time of 19 h. The superior performance of SWCNTs based AE can be attributed to the larger effective surface area of SWCNT that provides an increased platform for oxygen adsorption and reduction reaction to take place. It is clearly seen that enhancement of Zn-air battery cell performance is obtained with this architectures of air electrodes (AE Type 1 and Type 2).

5. Effect of Using SWCNTs as the AE

The discharge profile of conventional AE based only on carbon and by using only a single bucky paper of COOH- or P-CNT is shown in FIG. 3. AE made up of SWCNTs showed a better discharge plateau as compared to conventional carbon indicating that the AE Type 2 (FIG. 1C) electrodes are able to sustain the current drain. The discharge voltage of AE Type 2 (FIG. 1C) electrode made of 100% COOH-CNT (0.76 V) was higher than the 100% P-CNT. This is because the 100% COOH-CNT is made up of hydrophilic CNTs which have end —COOH groups that can be wetted by the electrolyte thus enabling ORR to occur and ion transfer to take place. However, 100% P-CNT does not have any hydrophilic (—COOH) groups attached to it making the surface more hydrophobic than 100% COOH-CNT. Hence effective wetting of the electrode cannot take place for the oxygen reduction catalyst (ORR) to take place which is seen in the discharge curve. During the ORR two concurrent process takes place and needs to be balanced for optimum performance of the AE (i) Oxygen diffusion takes place within the carbon nanostructures and (ii) oxygen reduction takes place on the carbon (with/without catalyst) and ion transfer takes place in the solution and equivalent amount of electrons flow through the external circuit as current. When a relatively hydrophobic surface like 100% P-CNT is provided then there is no obstruction to the oxygen diffusion from the air on to the electrode surface, but however due to the limited wettability the ORR does not take place effectively which would be evident in the discharge voltage. When a hydrophilic surface (100% COOH-CNT) is provided then there is limited access to the oxygen diffusion, however due to the wettability of the electrode the ORR Takes place much more effectively than the former. It is seen from our results that one of the factors that controls the discharge time of the AE seems to be the oxygen flow or diffusion of oxygen within the electrode. Unobstructed oxygen flow prolongs the lifetime of the device (but at a much lower discharge voltage), but flooding of the electrolyte on to the electrode surface increases the voltage but decreases the discharge time due to the unavailability of oxygen diffusion sites on the COOH-CNT electrode.

Although the results on the pure SWNT compares well with those in the literature, it needs to be mentioned that the discharge voltage is slightly lower in our studies because of the absence of (metallic) ORR catalyst. Also there was no other current collector used in our devices. Electrocatalyst was avoided so as to exclusively evaluate the effect of only AE architecture and CNT functionality on the device performance.

Figure 4:
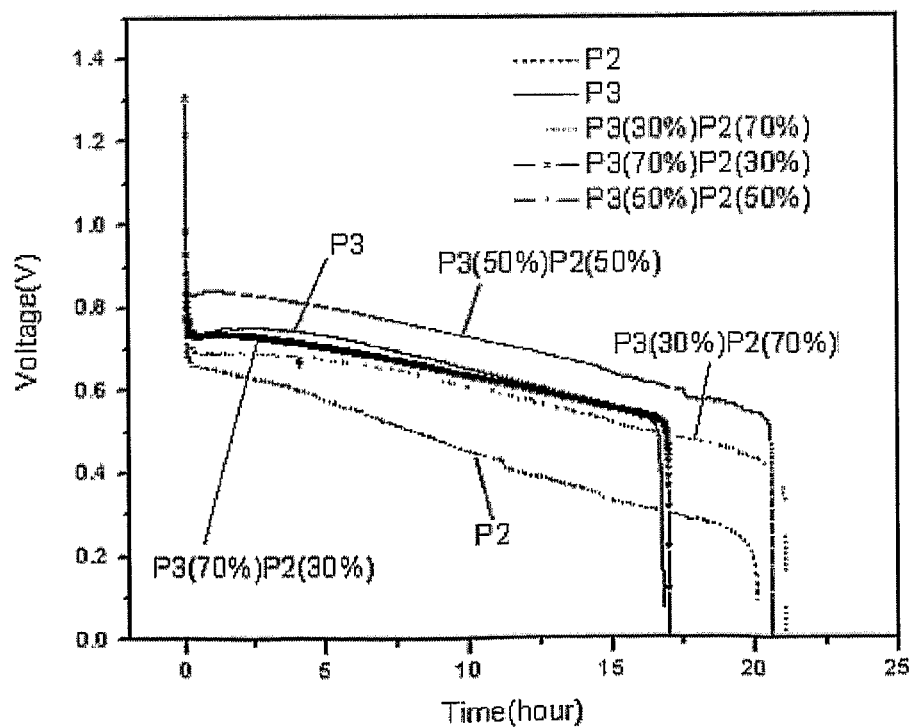
FIG. 4 shows galvanostatic discharge curves of zinc air cells with AE Type 2 electrode configuration with varying amount of COOH-SWCNT (P3) and P-SWCNT (P2).
Figure 5:
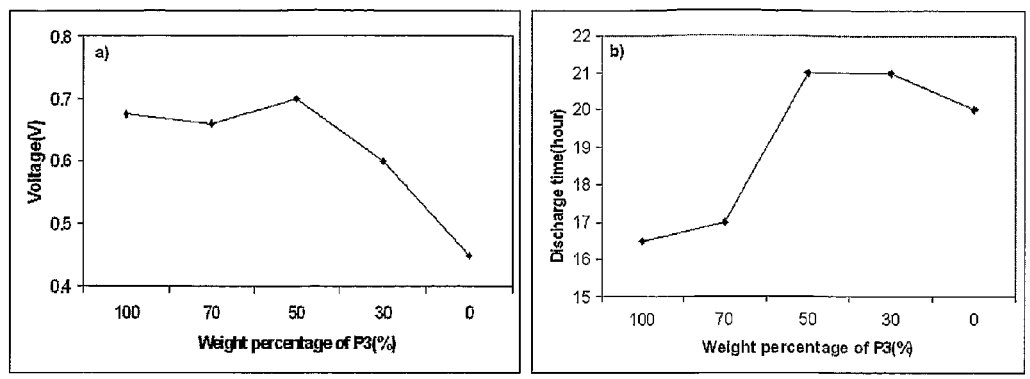
FIG. 5 shows a variation of a) Discharge voltage and b) Discharge time with respect to variation in weight percent of COOH-SWCNT (P3) in Zinc air batteries constructed using Zinc foil and air electrode of AE Type 2 configuration.

6. Effect of Varying the Ratio of COOH- and P-CNT in AE Type 2 (FIG. 1C) Electrode Architecture In an AE type 2 electrode configuration the amount of COOH-SWCNT and P-SWCNT were varied to evaluate its effect on the device performance. FIG. 4 shows the galvanostatic discharge curves of varying amount of COOH-SWCNT (labeled as P3) and P-SWCNT (labeled as P2) in the AE type 2-electrode configuration. It is seen that a mixture of 50:50% COOH-SWCNT and P-SWCNT gave a higher voltage plateau as compared to other composition. The discharge voltage and discharge times from this curve are extracted and plotted in FIG. 5.

There is a slight increase in the discharge voltage for 50 wt % COOH-SWCNT (FIG. 5a) after which increasing the amount of COOH-SWCNT in the mixture reduces the discharge voltage possibly due to flooding of the electrolyte in to the air electrode thereby decreasing the diffusion of oxygen that adversely affects the oxygen reduction reaction. The discharge time increases from 17 h for 70 wt % COOH-SWCNT to 21 h for 50 wt % COOH-SWCNT. The discharge time levels off after this composition and decreasing further the concentration of COOH-SWCNT does not affect the discharge time. This longevity of the device is related to the addition of hydrophobic P-SWCNT which promotes oxygen diffusion and prolongs the device lifespan. In terms of both discharge voltage and time it can be concluded from this study that a 50:50 wt. % mixture of COOH-SWCNT (P3) and P-SWCNT (P2) is a good composition in an AE type 2 electrode.

7. Effect of Ag Nanoparticle Decoration on COOH-SWCNT (AE Type2 Electrode)

Figure 6:
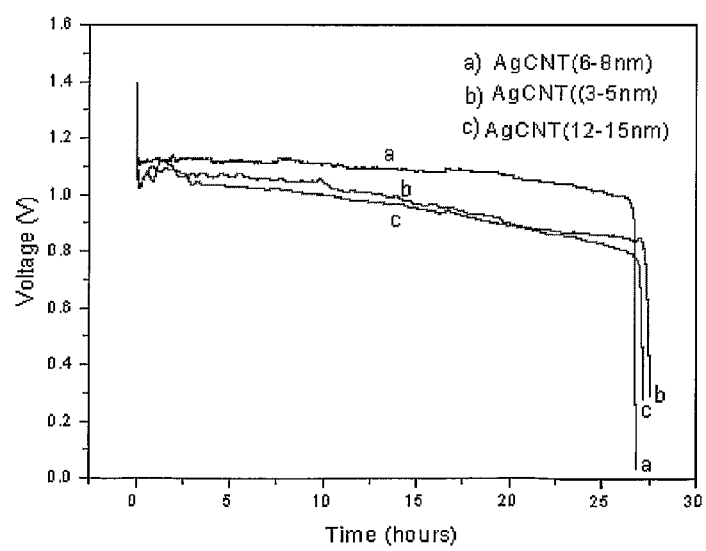
FIG. 6 shows galvanostatic discharge curves of Silver (Ag) of different sizes a) 6-8 nm, b) 3-5 nm and c) 12-15 nm decorated on to 100% COOH-SWCNT. The Zinc air cell was constructed using AE Type 2 electrode configuration.

It was seen from the above results discussed in the previous sections that the simple unified AE Type 2 electrode architecture exhibited the best performance. In a further step a catalyst was added to the SWCNT by decorating the COOH-SWCNT (100%) with metal particles, such as silver nanoparticles (Ag-CNT of various sizes, (3-15 nm)). FIG. 6 shows the galvanostatic discharge curves of the Zn-air batteries made using Ag-SWCNT of various sizes in AE type 2 electrode configuration. It is seen that the discharge voltages of Ag-SWCNTs are much higher (about 1.0-1.1V) than the pure COOH-SWCNT (0.75-0.8 V).

This is owing to the catalytic enhancement of the oxygen reduction process (ORR) by silver. The oxygen reduction process occurring at the AE is complex and involves a rate-limiting step of hydroperoxide ions ($HO_2^-$) formation that affects the reaction kinetics and battery performance. The intermediate $HO_2^-$ then reacts by catalytic disproportionation to $O_2$ and $OH_2^-$. Carbonaceous materials like CNT and activated carbon are known to reduce the oxygen to hydroperoxide ions. Additional catalysts (Pt, Ag or oxides) are required to completely reduce the hydroperoxide ions in to $OH^-$ radicals.

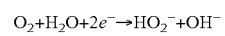

$$O_2 + H_2O + 2e^- \rightarrow HO_2^- + OH^-$$

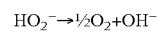

$$HO_2^- \rightarrow \tfrac{1}{2}O_2 + OH^-$$

Complete reduction of oxygen to hydroxyl radicals results in an increase in the discharge voltage and has been achieved using silver as cocatalyst (Ag-CNT). It appears that the 6-8 nm silver particle size give a slightly higher discharge voltage as compared to the other sizes. Electrocatalytic activity of silver particles depends crucially on its size on a physical dispersion of silver on carbon catalyst. The oxygen reduction reaction (ORR) that occurred on the Ag particles was structure sensitive reaction and depended on the crystal faces and active sites on silver.

8. Use of a Single Layer of a Decorated Nanostructure Material as Electrode Material (FIG. 1D)

Single-walled CNT functionalized with carboxylic groups (P3-SWCNTs, Carbon Solution Inc.) were dispersed in deionized water (0.5 mg/ml) with the aid of ultrasonic treatment (120 kW). The SWCNT suspension was mixed with an $AgNO_3$ (99.99%, Aldrich) solution (0.05-0.15 M, 100 mL) (the molar ratio of the silver nanoparticle precursor, $AgNO_3$, to the CNTs should be in the range of 0.18 to 0.54), followed by the addition of 0.1 M NaOH (99%, Merck) for pH adjustment (4.3<pH<7.3), and stirred vigorously for 15-120 min. The Ag-decorated SWCNTs were separated by centrifugation (15,000 rpm, 10 min) and excess sodium nitrate removed by multiple washings with deionized water. A stock suspension of the final product was prepared by redispersion in deionized water (20 mL). For electrode preparation, the mixture was filtered through a filter membrane (Whatman, Anodisc alumina filter membranes, pore size 20 nm) using a simple filter flask and moderate vacuum. This way, the Ag-decorated SWCNTs form an entangled network onto the filter. After rinsing with deionized water and drying in air, the SWNTs network film can be peeled off from the filter and was used as GDE without further treatment. The weight percentage of the Ag particles is approximately 2 wt. % according to the weight increment before and after decoration. The Ag nanoparticles decorated SWNTs were characterized by means of transmission electron microscopy (TEM, JEOL 2100F), x-ray diffraction (XRD, Shimadzu diffractometer operating at 4 kW and using CuKα radiation) and 4 probe resistivity measurement. For device testing, Zn powder was mixed with polyvinylidene fluoride binder (PVDF, 80:20), heated to 85° C. for 4 hours and finally pressed into films with thickness around 35 µm. Zn anode and SWNT air electrode were separated by a polypropylene (PP, Celgard 2400, US) film wetted thoroughly with 6 M KOH. Discharge was measured using a constant resistance of 11 kΩ.

Results

An important parameter for controlling the dispersion and size of the metal nanocrystals on SWCNT is pH, or the amount of hydroxyl ions ($OH^-$). After the introduction of SWCNTs to the 0.15 M $AgNO_3$ solution, the pH acidifies from 5.6 to 3.4 due to the presence of carboxyl groups (—COOH) on the exterior of the nanotubes, that subsequently interact with $AgNO_3$ to form $—COO^-Ag^+$ groups. For low but sufficient concentration of hydroxyl ions for reduction (pH~4), a high nucleation at the carboxyl groups and rapid growth of large silver crystals can be observed according to the proposed reaction

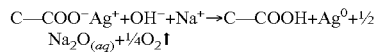

For higher concentration (pH about 6), the silver crystals highly dramatically decrease in size due to reaction between excess hydroxyl ions and silver ions in the suspension favoring the formation of AgOH and preventing the growth of nucleated silver metals.

Larger and poorly dispersed crystals (10 nm) appear at higher pH (pH 7.3) due to the reaction between excess hydroxyl ions with both silver ions in the suspension and $—COO^-Ag^+$ which promotes the concomitant release of AgOH

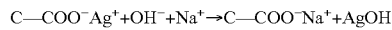

Consequently, fewer nucleation sites are available and the growth of silver nanocrystals decreases. The key role of reactive surface carboxyl groups was substantiated by the failure to decorate non-carboxyl-SWCNTs with silver, at pH 6.3 and the formation of large colloidal metal clusters.

Figure 7:
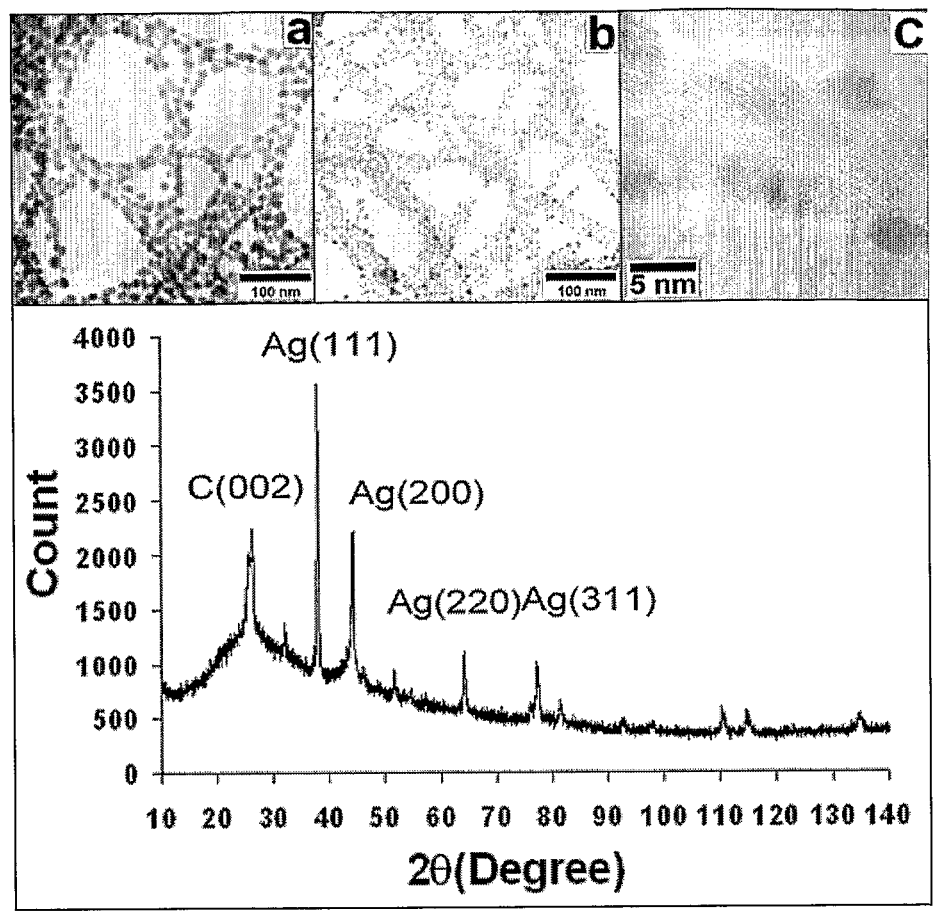
FIG. 7 shows TEM images of Ag nanoparticles decorated SWNTs with the particle size of (a) 12-15 nm, (b) 6-8 nm and (c) 3-5 nm as well as x-ray diffraction on sample c.

FIG. 7 shows the TEM images of Ag nanoparticles decorated SWCNTs with three particle sizes: 12-15 nm, 6-8 nm and 3-5 nm. In all samples, the Ag particles decorate the SWCNTs uniformly. Neither Ag particle agglomerates nor uncovered parts were observed among the material investigated. Also, the size of the Ag nanoparticles has been controlled successfully by means of pH adjustment and reaction time during synthesis, as confirmed by the rather narrow size distribution (see also Table 1). Since the same amount of SWCNTs and the same concentration of the Ag precursor have been used for all samples it is reasonable to assume that the same amount of Ag has been decorated onto the SWCNTs. Accordingly, the smaller particle size leads to more individual particles (compare FIGS. 7a and 7b).

TABLE 1

Experimental parameters for decoration of Ag nanoparticles of different sizes onto SWCNTs

| pH adjusted | Reaction time [h] | Average Ag crystal size [nm] |
|---|---|---|
| — | — | not decorated |
| 4.3 | 2 | 12-15 |
| 6.3 | 2 | 6-8 |
| 6.3 | 1 | 3-5 |

Figure 8:
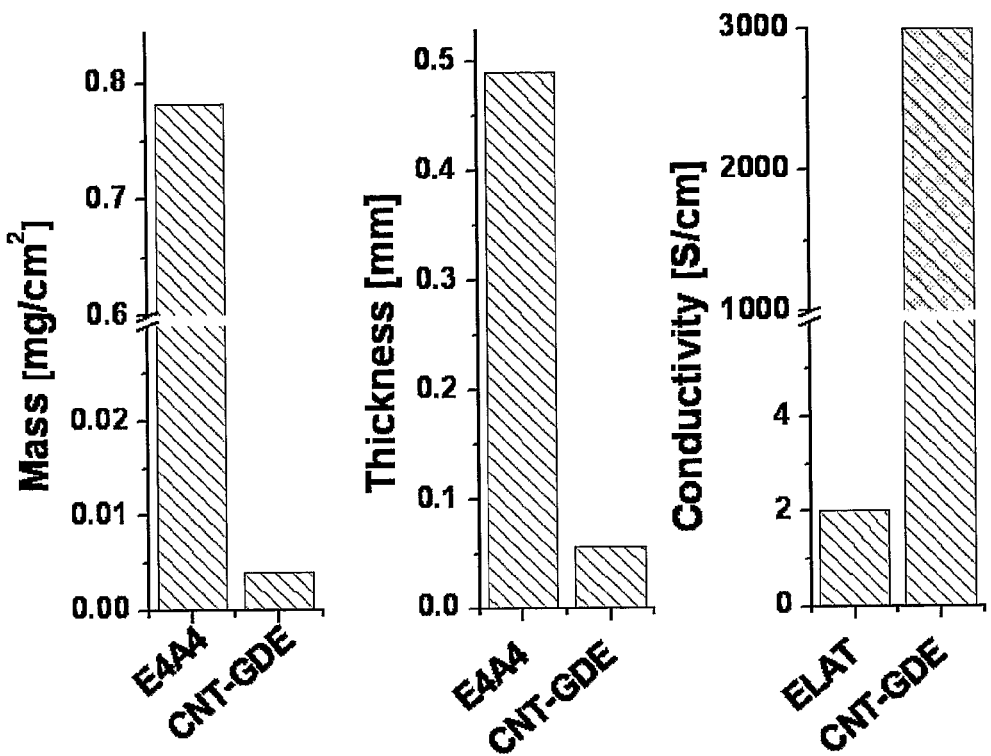
FIG. 8 illustrates a comparison of SWCNT based gas diffusion electrodes (GDEs) with commercially available GDEs (Electric Fuel limited, Israel, product line E4A; BASF, Germany, product line ELAT) in terms of thickness, weight and conductivity.

Weight, thickness and conductivities of the bare SWCNT networks and the Ag nanoparticle decorated SWCNT networks have been compared to commercially available gas diffusion electrode (GDE) based on pressed carbon on a nickel mesh (Electric Fuel limited, Israel, product line E4A; BASF, Germany, product line ELAT). The conductivities of the SWCNT samples have been measured in a 4-point probe configuration while the values of the commercially available samples are taken from the manufactures specifications. The results are compared in FIG. 8. The advantage of GDEs based on SWCNT networks over commercially available GDEs is obvious. Weight and thickness are reduced by more than one order of magnitude which is of particular interest for portable devices where weight and space are crucial factors. The conductivity, on the other hand increases by around three orders of magnitude. Among the SWCNT film, the conductivity is significantly higher for Ag decorated material. (bare SWCNT films: about 1000 S/cm, decorated SWCNT films: 2000-3000 S/cm). The highest conductivity (about 3000 S/cm) has been found for the smallest Ag particle size (3-5 nm) which can be explained by a maximum number of additional current paths within the SWCNT network.

Figure 9:
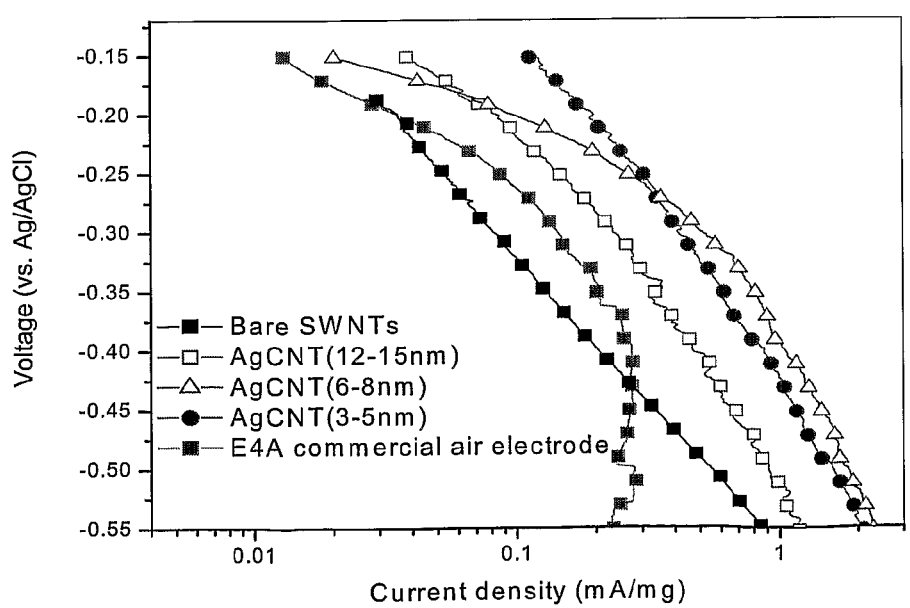
FIG. 9 shows potentiodynamic polarization of an undecorated SWCNTs, commercial E4A air electrode and Ag nanoparticles decorated SWCNTs with different particle sizes.

The electrochemical behavior of SWCNTs films decorated with Ag nanoparticles has been investigated using potentiodynamic polarization. One side of the SWCNT films was exposed to the air so that all films were measured in a GDE configuration. For comparison, a not decorated SWCNT film and a commercially available air electrode (E4A) have also been tested, and the results are presented in FIG. 9. Current has been normalized by weight (mA/mg) to account for any sample to sample variance while the area of all GDEs was kept constant (about 1 cm²). In general, the current density significantly increased upon Ag nanoparticle decoration when compared to not decorated SWCNTs electrodes and the commercially available E4A air electrode. Taking the size of the Ag nanoparticles into account, the current density increases with smaller Ag nanoparticles which can be explained by a higher surface area. Compared to the not decorated SWCNT electrode, the current density of the GDE containing the smallest Ag nanoparticles (3-5 nm) increased by a factor of 5.

Figure 10:
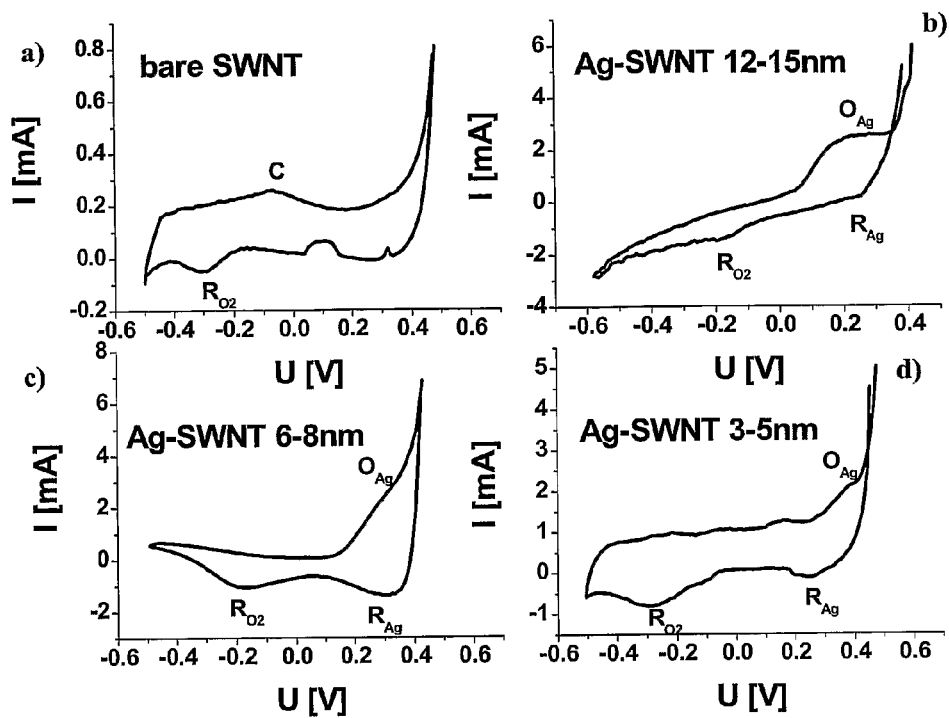
FIG. 10 illustrates a comparison of cyclic voltammograms of Ag decorated SWCNTs with different particle sizes at scan rate of 10 mV/s in 6 M KOH solution (a-d).

Cyclic voltammetry (CV) was employed to investigate the electrochemical behavior of the SWCNT GDEs decorated with Ag nanoparticles of different sizes. For comparison, an undecorated SWCNT GDE was tested as well as shown in FIG. 10a. For all samples, a reduction peak at around −0.3 V (labeled with '$R_{O2}$') has been observed indicating oxygen reduction ($O_2+2H_2O+4e^-\rightarrow 4OH^-$). For all Ag decorated SWCNT films, one oxidation and two reduction peaks can be observed in addition. The oxidation peak appearing at around 0.25 V (labeled with '$O_{Ag}$') can be attributed to the oxidation of Ag to $Ag_2O$ ($2Ag+2OH^-\rightarrow Ag_2O+H_2O+2e^-$). The first reduction peak at around 0.28 V (labeled with '$R_{Ag}$') indicates the reduction of $Ag_2O$ to Ag, while the second one corresponds to the oxygen reduction mentioned before. An additional peak for the bare SWNT sample can be observed around −0.1V (labeled with 'C') and is due to oxygen containing functional groups.

Figure 11:
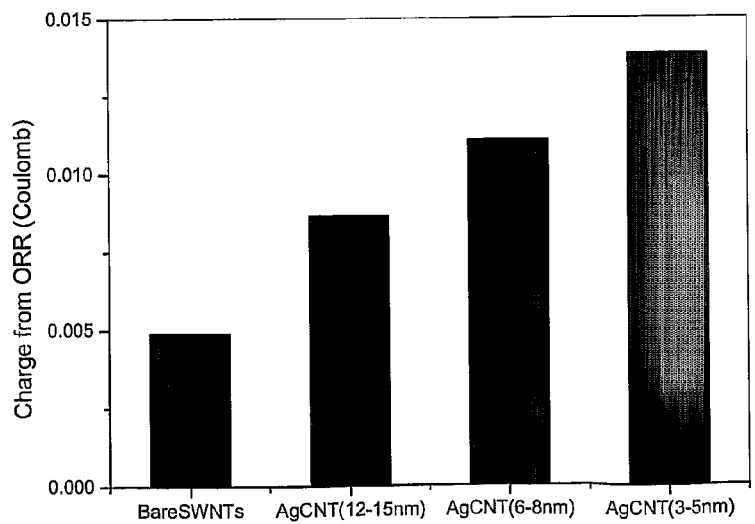
FIG. 11 illustrates the total charge for oxygen reduction for undecorated and Ag decorated SWCNT films.

In general, the total current density for all reduction processes increases when Ag particle size decreases due to the higher surface area for smaller Ag particles. For all Ag decorated SWNT films, reactions due to surface functional groups cannot be observed indicating that Ag oxidation/reduction and oxygen reduction become the dominant features upon Ag decoration. For a more detailed analysis, the total charge for oxygen reduction was been analyzed by integrating the corresponding peaks of CV as shown in FIG. 11. It is obvious that the charge for oxygen reduction increased significantly upon Ag decoration, and further increased with Ag particle size decreasing. Hence, Ag promotes oxygen reduction reaction under the experimental conditions applied.

Figure 12:
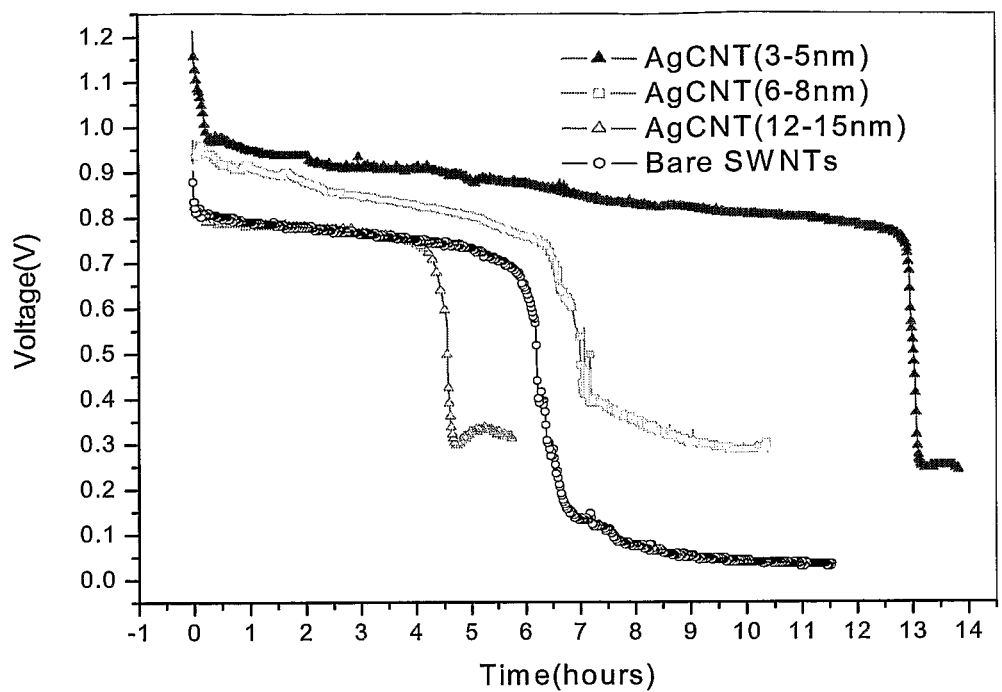
FIG. 12 shows a discharge with a constant resistance of Zn-air batteries using GDEs based on SWCNTs decorated with Ag nanoparticles of different size. Note that different amounts of Zn have been used leading to different operating times of the devices.
Figure 13:
FIG. 13 shows a TEM image of $MnO_2$ nanoflakes obtained by a method described herein and which were bound on the surface of a nanostructured material. Scale bar 100 nm.

For device testing, the SWCNT networks decorated with Ag nanoparticles have been used as air electrodes in a home build Zn-air battery configuration. Note that neither a binder nor a water repellent such as PTFE has been added. For all devices tested, the Zn containing anodes have been prepared the same way. Hence, all changes in performance are due to differences between the SWCNT based GDEs. The discharge characteristics are presented in FIG. 12.

The open circuit voltages were around 1.2 V which is in good agreement with values of commercially available devices confirming that neither SWNT nor the Ag particles lead to different battery chemistry. After connecting the device to a 1 kg load, the voltage dropped according to the conductivities listed in Table 2. The different operating times were due to different amounts of Zn material used.

Among the Ag-decorated SWNT GDEs, the smallest particle size seems to be favorable over the other particle sizes investigated. Not only the voltage drop is minimized due to the highest conductivity among all samples, but also the discharge curve is among the flattest ones when compared to the other samples. For a better comparison, the performance of all devices has been summarized in table 2 in terms of conductivity of the SWNT film, specific capacity C and specific energy E using $C=I*t/m_1$ and $E=I \cdot V \cdot t/m_2$, respectively, where I is the discharge current, t the discharge time, V the operating voltage, and $m_1$ is the mass of the SWNT based GDE and $m_2$ the weight of the device including electrodes, separator and electrolyte. Compared to GDE based bare SWNTs, it is obvious that both specific capacity and energy are improving upon decoration with Ag nanoparticles with diameters less than 8 nm. The best performance has been achieved for GDEs based on SWNTs decorated with the smallest Ag nanoparticles investigated. Both specific capacity and energy density have been doubled. The improved performance with smaller Ag particle size can be explained by a larger number of Ag particles leading to more catalytically active sites and subsequently to a higher current density. On the other hand, decoration with Ag nanoparticles 12-15 nm in size decreases the device performance possibly due to a lower overall surface area compared to a all other samples leading to a lower current density.

TABLE 2

Characteristics of Zn-air cells utilizing GDEs based on SWNTs films decorated with Ag nanoparticles of different sizes.

| Zn-air cells utilizing a GDE based on | GDE Conductivity [S/cm] | Specific Capacity (mAh/g) | Energy Density (Wh/kg) |
|---|---|---|---|
| bare SWCNT | 1025 | 270 | 125 |
| 12-15 nm Ag-CNT | 1840 | 170 | 85 |
| 6-8 nm Ag-CNT | 3020 | 340 | 180 |
| 3-5 nm Ag-CNT | 3090 | 515 | 300 |
| commercial devices | ~2 | 200-600 | 250-400 |

For comparison, the typical performance range of commercially available GDEs and devices has been listed, too.

Gas diffusion electrodes (GDEs) based on SWCNT networks lead to a significant weight reduction when compared with regular GDEs. In addition, utilizing SWCNTs decorated with Ag nanoparticles leads to a significant improvement in terms of capacity and energy density in a Zn air battery. The optimum Ag catalyst particle size was found to be the smallest (4 nm) among the samples investigated doubling capacity and energy density when compared to bare SWNT based GDEs. Hence, SWCNTs decorated with Ag nanoparticles are promising materials for GDEs in light weight applications with higher performance demands.

9.1 Gold Decorated Single Walled Carbon Nanotubes.

Gold stock solutions were prepared by adding 0.1 M NaOH (Sigma-Aldrich) dropwise to 20 ml of 3.0-6.3 mM $HAuCl_4$ ($HAuCl_4.3H_2O$, Alfa Aesar) (4.5 mM in this example) until the pH stabilized at predetermined values ranging from 4 to 10. SWCNTs suspension (0.08 g in 15 mL of deionized water) was dispersed in the solution comprising the gold precursor (molar ratio of gold precursor to SWCNTs should be 0.1 to 0.55). The pH in the solution after mixing the SWCNTs with the gold precursor is about 3.5. The resulting mixture was aged at 75° C. with vigorous stirring for 30 min after which the gold loaded catalysts were collected by filtration and washed repeatedly with deionized water to remove chloride.

9.2 Platinum Decorated Single Walled Carbon Nanotubes.

The solution of $H_2PtCl_6.6H_2O$ (3.0-6.3 mM, Aldrich, 5 mM in this example) in deionized water was adjusted to the desirable pH (4-9). SWCNTs suspension (0.08 g in 15 mL of deionized water) was dispersed in the Pt precursor solution (molar ratio of Pt precursor to SWCNTs should be 0.1 to 0.55) followed by the addition of methanol (Merck) as a reductant. The suspension was aged at 75° C. for 40 min and washed several times with deionized water.

9.3 Synthesis of $MnO_2$ Nanoflakes

Solution A containing 0.2 g of manganese nitrate $Mn(NO_3)_2$ dissolved in 10 mL of distilled water was added under vigorous stirring to Solution B containing 0.5 g of $KMnO_4$ in 10 mL of distilled water. The resultant solution was stirred for 2 h and then transferred in to a Teflon® lined stainless steel autoclave and placed in the oven at temperatures 140-170° C. for 1-24 h to obtain the product which was washed several times with distilled water until the pH of the solution was 7. This was air dried in an oven at 100° C. for 24 h. Nanoflakes obtained by this method are shown in the TEM image of FIG. 14.

9.4 Synthesis of $MnO_2$ Nanoflowers and Nanowires

Figure 14:
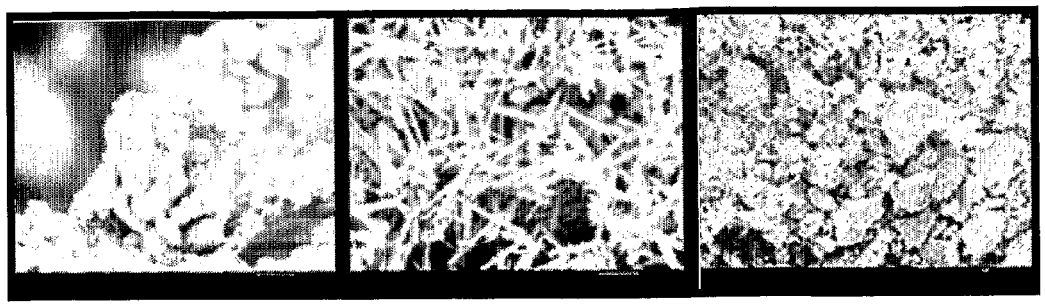
FIG. 14 shows SEM images of $MnO_2$ nanoflowers (left image), $MnO_2$ nanowires (central image) and $MnO_2$ powder (right image) obtained by a method described herein. (scale bars in all images 1 μm)

Aqueous solutions of $MnSO_4$ (8 mg/ml) and $KMnO_4$ (20 mg/ml) were mixed and transferred to a Teflon-lined stainless steel autoclave. The autoclave was then loaded into an oven preheated to 140° C. The dwell time for the reaction was varied from 1 to 18 hours in order to optimize the material for electrochemical applications. By heating the well mixed solution of $MnSO_4$ and $MnSO_4$ for 1 hour, $MnO_2$ nanoflowers are formed as shown in FIG. 14 (left image). Increasing the hydrothermal reaction time further to 18 hours, large amount of individual nanowires are formed as shown in FIG. 14 (central image). The diameter of $MnO_2$ nanowires is about 80 to about 150 nm and the length is more than 1 micrometer. After the dwell time at 140° C. the autoclave was cooled to room temperature naturally. The formed brownish black precipitate was filtered and washed with de-ionized (DI) water to remove any unreacted starting material and the soluble byproducts produced during reaction. The precipitate was dried at 100° C. in air and $MnO_2$ nanoflowers/nanorods were ready for collection after 1 hour. FIG. 14 (right image) shows SEM images of commercially available $MnO_2$ powder with particle size of 2 to 3.5 μm.

The BET surface measurement of $MnO_2$ nanoflowers, $MnO_2$ nanowires and $MnO_2$ powder are summarized in the following Table 3. The following Table 3 summarizes the results obtained from these measurements.

TABLE 3

| BET surface area ($m^2$/g) of $MnO_2$ nanostructures and $MnO_2$ powder | | | |
|---|---|---|---|
| | $MnO_2$ nanoflower | $MnO_2$ nanowires | $MnO_2$ powder |
| BET surface area($m^2$/g) | 106 | 13 | 91 |

9.5 $MnO_2$ Decorated Single Wall Nanotubes (SWCNT)

Solution A containing 0.2 g-0.5 g of manganese nitrate $Mn(NO_3)_2$ or manganese acetate dissolved in 10 mL-20 mL of distilled water was added under vigorous stirring to Solution B containing 0.5 g-0.9 g of $KMnO_4$ in 10 mL-20 mL of distilled water. 0.05-0.2 g of SWCNT was dispersed in the solution under stirring and heating at 50-80° C. The pH was controlled from 1-7 using 0.01 M HCl or 0.01-0.05 M $HNO_3$ (depending on the pH the $MnO_2$ particle size/dispersity varies). The resulting suspension after stirring for 1-2 h is centrifuged, washed with distilled water and dried in an oven at 100° C. for 24 h.

Figure 23:
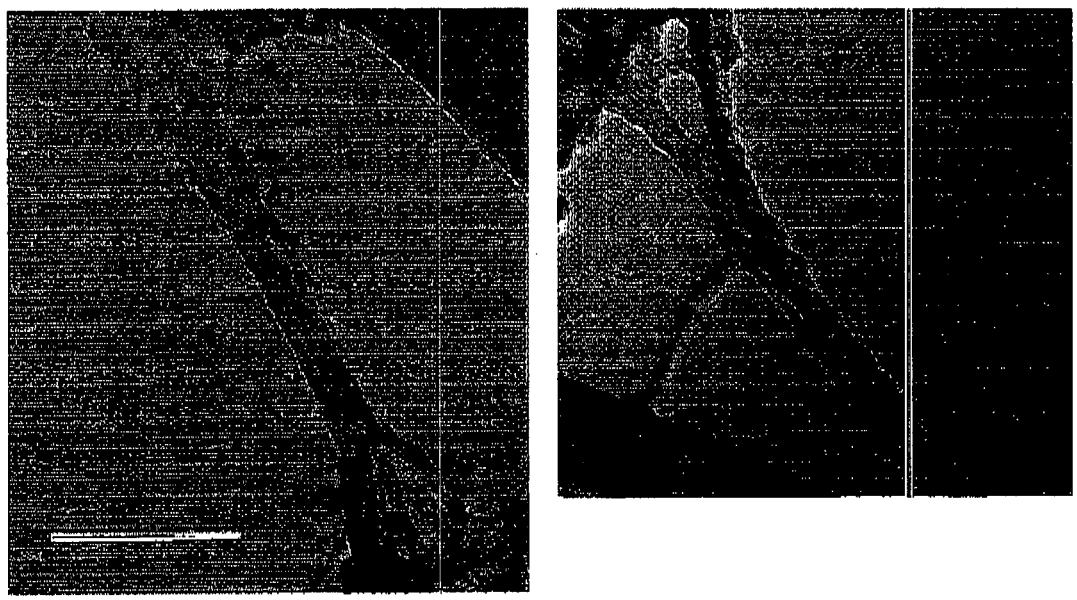
FIG. 23 shows TEM images of single walled carbon nanotubes which have MnO$_2$ nanostructures bound to their surface. The average size of the nanostructures is between about 1 to 10 nm. (left and right image show the same structure but the magnification is different; scale bar left image 100 nm, scale bar right image 20 nm).

In an alternative approach for the manufacture of $MnO_2$ decorated nanostructures, 10 mg of single walled carbon nanotubes were dissolved in 100 ml distilled water and were mixed for about 30 minutes using sonification of the solution. Afterwards, samples of the solution were then added to a solution of $KMnO_4$ (40 mg of $KMnO_4$ in 200 ml of $H_2O$). The resulting mixture was stirred for 3 days at pH 8.5 at a temperature of about 70° C. During the reaction the purple color of the $KMnO_4$ solution disappeared as oxidation takes place. At the end of the 3 day incubation the solution is filtered and washed to obtain $MnO_2$ decorated SWCNT. FIG. 23 shows TEM images of $MnO_2$ decorated SWCNT, wherein the $MnO_2$ nanoparticles bound to the surface of the SWCNT have an average size of between about 1 to 10 nm. The images provided in FIG. 23 show the same structure but the magnification is different.

9.6 Synthesis of $TiO_2$ Nanotubes

Figure 15:
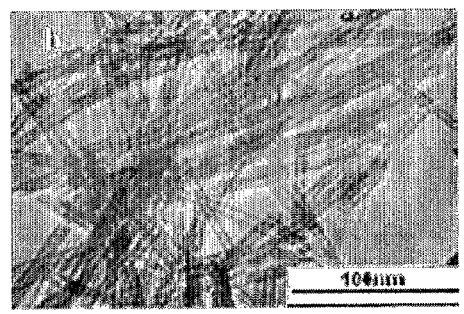
FIG. 15 shows a TEM image of TiO$_2$ nanotubes obtained by a method described herein and used for decoration with metal nanoparticles as described herein. Scale bar 100 nm.

Titania ($TiO_2$) powder 0.5-1.0 g was added to a 15 M solution of sodium hydroxide and stirred vigorously for 2 h. Then the contents were transferred in to a Teflon® lined stainless steel autoclave which was placed in the oven for 4-5 days at 170° C. The resultant dispersion was washed several times with 0.1 mol/L $HNO_3$ till the pH is 7 and then dried in the oven at 80° C. for 24 h. Nanotubes obtained by this method are illustrated in the TEM image of FIG. 15. Using the above methods the $TiO_2$ nanotubes can be decorated with metal nanoparticles.

10 Optimization of Synthesis Condition for Decoration of Nanostructured Material The findings have shown that pH, reaction time and $AgNO_3$ concentration are the main parameters controlling the dispersion and size of AgNP on SWCNT. After introduction of SWCNTs to 0.15 M $AgNO_3$ solution, the pH decreases from 5.6 to 3.4 as shown in Table 4 due to the presence of the acidic carboxyl groups on the nanotubes.

TABLE 4

Silver nanoparticle characteristics as a function of pH and reaction time for metal decorating single-walled carbon nanotube

| Sample | $AgNO_3$ conc. (M) | pHs[a] | pHsc[b] | pHn[c] | rxn. time (min) | average Ag crystal size[d] (nm) |
|---|---|---|---|---|---|---|
| AgCNT1 | 0.15 | 5.6 | 3.4 | 4.3 | 120 | 15 |
| AgCNT2 | 0.05 | 5.6 | 3.4 | 6.3 | 15 | 1 |
| AgCNT3 | 0.10 | 5.6 | 3.4 | 6.3 | 15 | 3 |
| AgCNT5 | 0.15 | 5.6 | 3.4 | 6.3 | 60 | 4 |
| AgCNT6 | 0.15 | 5.6 | 3.4 | 6.3 | 120 | 6 |
| AgCNT7 | 0.15 | 5.6 | 3.4 | 7.3 | 120 | 10 |

Figure 19:
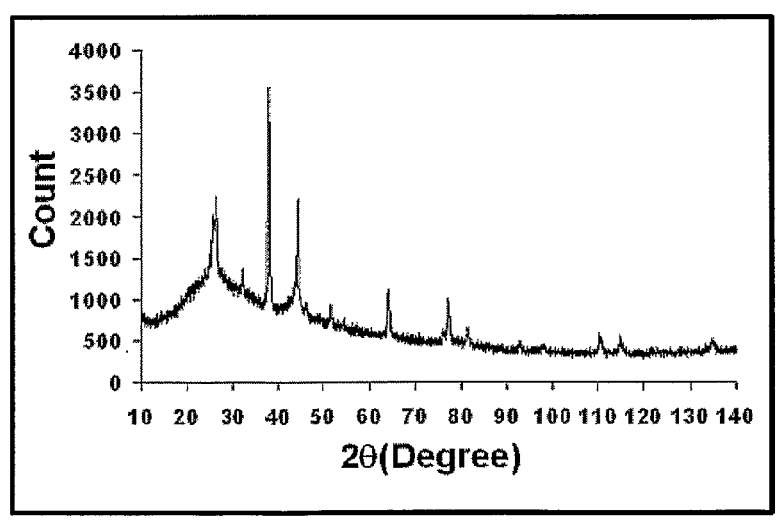
FIG. 19 is a XRD plot showing the metallic silver reflections of AgCNT6.
Figure 20:
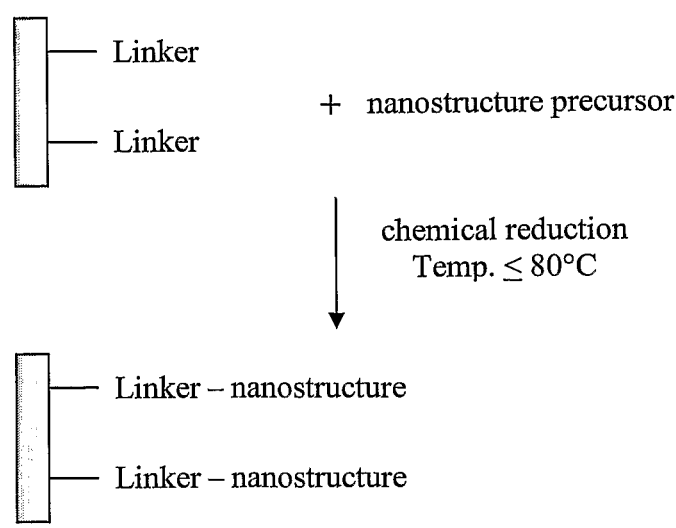
FIG. 20 discloses the general principal of the method of manufacturing a porous nanostructured material wherein the porous nanostructured material comprises catalytic nanostructures bound to its surface.

[a]pH of $AgNO_3$ solution.
[b]pH of $AgNO_3$ after added SWCNTs.
[c]pH of suspension after added NaOH.
[d]Determined by TEM. rxn. time = incubation time Subsequently, the absorption of $AgNO_3$ with these groups on the CNT forms COO—Ag groups (FIG. 16). The addition of NaOH solution is a critical step in controlling pH to ensure that the quantity of hydroxyl ions is sufficient for the progressively reduction of $Ag^I$ to $Ag^0$. Table 4 shows the silver nanoparticle size of three different samples as a function of pH and reaction time. At pH 4.3 (after added NaOH), the Ag nanoparticle size decorated on SWCNTs was the largest with the diameter about 15 nm (FIG. 17a). As the pH increases to 6.3, the Ag nanoparticles size dramatically decreases to 6 nm (FIG. 17b) for the same reaction time. This phenomenon might be due to the reaction between excess hydroxyl ions and the COO—Ag groups at higher pH, which promotes the reformation of carboxyl groups on SWCNTs with concomitant release of Ag—OH. Consequently, the number of available nucleation sites and the growth of Ag nanoparticles decrease. By the reducing of aging time from 120 min to 15 min (at the same pH condition), the size of the Ag nanoparticles decreases from 6 nm to 3 nm (FIGS. 17b and 17c). This indicates that longer reaction time actually yielded larger Ag nanoparticles through the crystal growth and aggregation after nucleation. The variation of $AgNO_3$ concentrations (0.05-0.15 M, pH 6, aging time 15 min) was studied to optimize the condition which the colloidal Ag cluster formation can be prevented. At the excess Ag precursor than required for nucleation and growth (0.15 M), the mixture of large colloidal Ag clusters (20-100 nm, FIG. 18a) and Ag decorated on SWCNTs (3 nm) were formed. The absence of Ag clusters with constant size of Ag on SWCNTs as 0.15 M condition was obtained when reduced the AgNO$_3$ concentration to 0.10 M. The lower dispersion and smaller silver crystal size, 1 nm, on SWCNT surfaces (FIG. 18b) were achieved at 0.05 M AgNO$_3$ solution. XRD pattern (FIG. 19) confirms the formation of cubic Ag$^0$ at 2θ=38, 45, 64, 78, and 82.

11 Electrode for Supercapacitor

Figure 21:
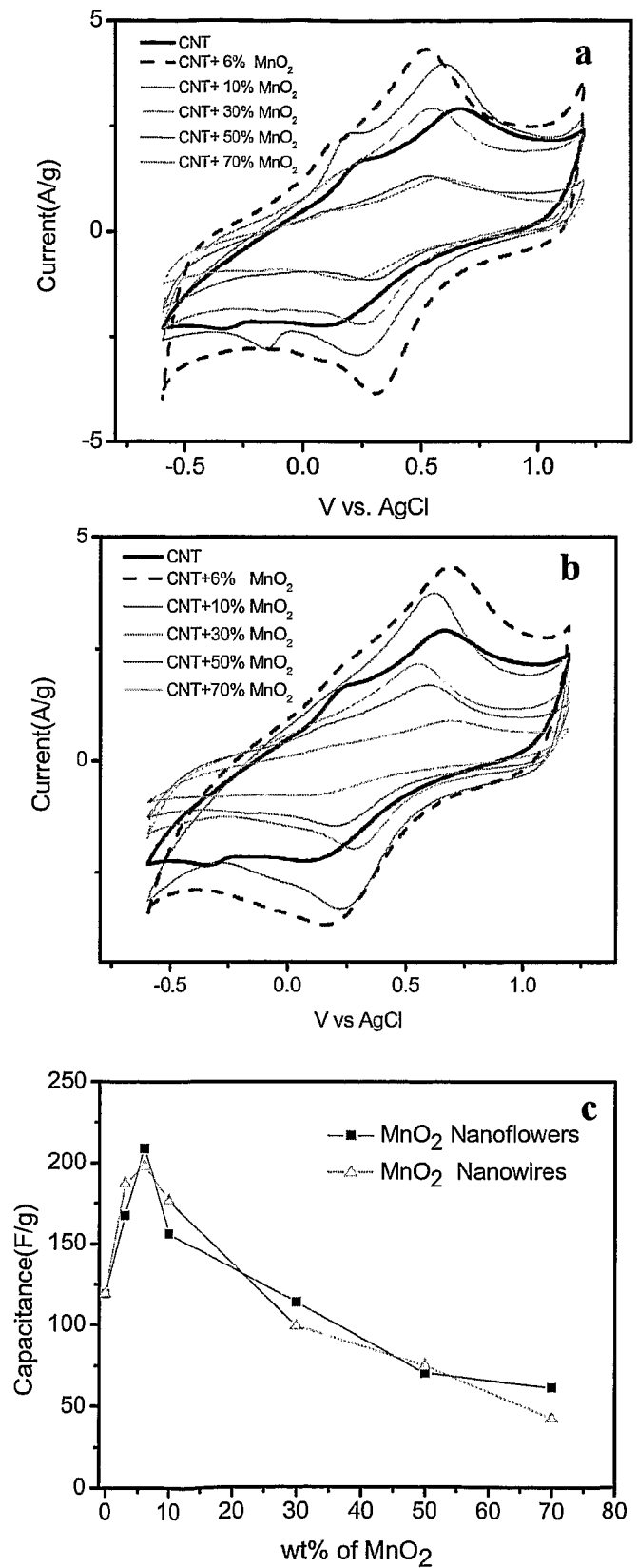
FIG. 21 shows cyclic voltammograms for pristine CNT, mixture of CNT with 6, 10, 30, 50 and 70 wt % of MnO$_2$ (FIG. 21 a) nanoflowers (FIG. 21 b) nanowires measured at 20 mVs$^{-1}$ from 0 to 1V.

FIG. 21 shows cyclic voltammograms for six supercapacitor devices with following electrode materials: reference device with CNT electrode (designated CNT in FIG. 21), mixture of nanostructures of MnO$_2$ with CNT for five different weight percentage (wt. %) ranges: 6, 10, 30, 50 and 70, which are presented in FIG. 21(a) for MnO$_2$ nanoflowers and 21(b) for MnO$_2$ nanowires. MnO$_2$ serves as catalyst material. Both MnO$_2$ nanoflowers and nanowires with 6 wt % reached the highest capacitance of ~198-209 F/g. FIG. 21(c) shows specific capacitance versus wt. % of MnO$_2$ nanoflowers and nanotubes mixed with CNT, which indicates that 6 wt. % is the optimized mass ratio of MnO$_2$ in CNT electrode for obtaining highest specific capacitance.

Figure 22:
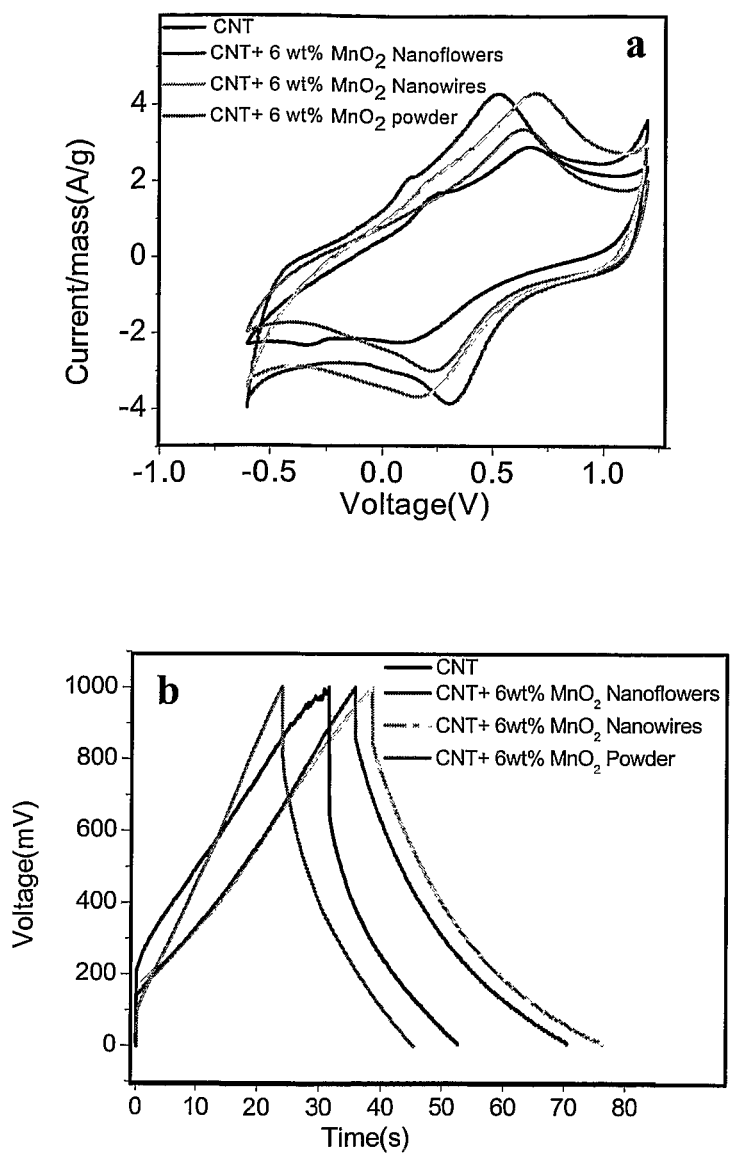
FIG. 22 shows cyclic voltammograms for pristine CNT, mixture of CNT with 6 wt. % of MnO$_2$ nanostructures, such as nanoflowers, nanowires; and micron-sized powder measured at 20 mV/s from 0 to 1V. (b) Galvanostatic charge-discharge curves for the same devices mentioned in (a) measured at about 1 A/g.

Cyclic voltammograms for four supercapacitor devices with following electrode materials: reference device with CNT electrode, 6 wt. % MnO$_2$ nanostructure mixed with CNT (MnO$_2$-CNT) for three different morphologies: nanoflowers, nanowires and powder (powder in the form of micron-sized particles) are presented in FIG. 22(a). The specific capacitance of all the devices as determined using both cyclic voltammetry (CV; FIG. 22(a)) and galvanostatic charge and discharge (GCD; FIG. 22(b)) methods, ranged from 58-209 F/g as shown in Table 5.

TABLE 5

Specific capacitance, energy and power densities measured for CNT and MnO$_2$-CNT devices using both CV and GCD methods.

| Sample | Capaciatance (F/g) | | Energy Density (Wh/kg) | Power Density (W/kg) |
|---|---|---|---|---|
| | CV | Galv | | |
| CNT | 119.5 | 57.7 | 3.1 | 483.2 |
| CNT + 6 wt. % MnO$_2$ Nanoflowers | 208.9 | 78.3 | 5.0 | 767.6 |
| CNT + 6 wt. % MnO$_2$ Nanowires | 197.8 | 83.1 | 4.9 | 675.8 |
| CNT + 6 wt. % MnO$_2$ powder | 148.3 | 61.2 | 3.6 | 651.0 |

The invention claimed is:

1. An electrode comprised of:
  a first layer comprised of a mesoporous nanostructured hydrophobic material; and
  a second layer comprised of a mesoporous nanostructured hydrophilic material arranged on the first layer;
  wherein the layers are free of a binder;
  wherein the mesoporous nanostructured hydrophilic material further comprises a linker bound on its surface; and
  wherein the mesoporous nanostructured hydrophilic material further comprises a catalytic nanostructure which is bound to the surface of the mesoporous nanostructured hydrophilic material via the linker, wherein the linker is comprised of an unsaturated carboxylic acid having 12 carbon atoms or less.

2. The electrode according to claim 1, wherein the mesopores have a maximal dimension between about 2 to 50 nm.

3. The electrode according to claim 1, wherein the nanostructured material is selected from the group consisting of nanotubes, nanowires, nanoflakes, nanoparticles, nanoflowers, nanodiscs, nanofilms and combinations of the aforementioned nanostructured materials in a mixture.

4. The electrode according to claim 3, wherein the nanotubes are single-walled or double-walled or multi-walled nanotubes.

5. The electrode according to claim 1, wherein at least one dimension of the nanostructured material is less than 100 nm.

6. The electrode according to claim 1, wherein the nanostructured material is made of a material selected from the group consisting of a carbon material, a ceramic, glass, a metal, a metal oxide, a polypyrrole and mixtures of nanostructured materials made of different of the aforementioned materials.

7. The electrode according to claim 6, wherein the carbon material is selected from the group consisting of activated carbon, carbon blacks and graphene.

8. The electrode according to claim 1, wherein the linker is benzoic acid.

9. The electrode according to claim 1, wherein the mesoporous nanostructured hydrophilic material and the mesoporous nanostructured hydrophobic material are made of the same or different substances.

10. The electrode according to claim 1, wherein the layers are arranged on a support material.

11. The electrode according to claim 10, wherein the support material is a paper-like free standing film.

12. The electrode according to claim 11, wherein the paper-like free standing film is a bucky paper or a thin film of sprayed or printed active material on a flexible conducting substrate, or a free standing film of a nanostructured material.

13. The electrode according to claim 1, wherein the nanostructures of the mesoporous nanostructured hydrophilic material are catalytic nanostructures.

14. The electrode according to claim 13, wherein the nanostructures are made of a substance selected from the group consisting of a noble metal, an alloy, an intermetallic, a metal oxide or a transition metal oxide and mixtures thereof.

15. The electrode according to claim 14, wherein the alloys are alloys of elements from group 10, 11, 12, 13, 14, 16 or mixtures thereof (IUPAC nomenclature).

16. The electrode according to claim 14, wherein the alloys are alloys of Au, or Pt, or Pd, or Cu, or In, or InSe, or CuSe, or SnS$_2$ or mixtures thereof or Ag$_2$Ni.

17. The electrode according to claim 14, wherein the metal oxide is selected from the group consisting of Ag—MnO$_2$, Al$_2$O$_3$, MoO$_3$, MnO$_2$, V$_2$O$_5$, TiO$_2$, SiO$_2$, ZnO$_2$, SnO$_2$, Fe$_2$O$_3$, NiO, Co$_3$O$_4$, CoO, Nb$_2$O$_5$, W$_2$O$_3$, and mixtures thereof.

18. The electrode according to claim 14, wherein the noble metal is selected from the group consisting of silver, palladium, gold, platinum and mixtures thereof.

19. The electrode according to claim 13, wherein the nanostructure is selected from the group consisting of nanotubes, nanowires, nanoflakes, nanoparticles, nanoflowers, nanodiscs, nanofilms and combinations of the aforementioned nanostructured materials in a mixture.

20. The electrode according to claim 19, wherein the nanoparticles have a size between about 0.5 to about 40 nm.

21. The electrode according to claim 1, wherein between about 5 to about 80% of the surface of the mesoporous nanostructured hydrophilic material is covered with the nanostructures.

22. The electrode according to claim 21, wherein the nanostructures are evenly dispersed at the surface of the mesoporous nanostructured hydrophilic material.

23. The electrode according to claim 1, wherein the nanostructure is a nanoparticle and wherein the maximal dimension of the nanoparticles is between about 1 to 20 nm.

24. The electrode according to claim 23, wherein the nanoparticle size distribution for nanoparticles with a size of between about ≥12 nm to 20 nm is about ±5 nm; wherein the particle size distribution for nanoparticles with a size of between about ≥5 nm to <12 nm is about ±3 nm and wherein the nanoparticle size distribution for nanoparticles with a size of between about 2 nm to <5 nm is about ±1 nm.

25. The electrode according to claim 1, wherein each layer is between about 10 μm to about 30 μm thick.

\* \* \* \* \*